US006639608B1

United States Patent
Itakura

(10) Patent No.: US 6,639,608 B1
(45) Date of Patent: Oct. 28, 2003

(54) SYSTEM FOR DISPLAYING TWO INDEPENDENT IMAGES RECEIVED FROM NETWORK

(76) Inventor: Yuichiro Itakura, 2-14-19, Natsumi, Funabashi, Chiba (JP)

( * ) Notice: Subject to any disclaimer, the term of this patent is extended or adjusted under 35 U.S.C. 154(b) by 0 days.

(21) Appl. No.: 09/117,331

(22) PCT Filed: Jan. 22, 1997

(86) PCT No.: PCT/JP97/00125

§ 371 (c)(1),
(2), (4) Date: Jul. 20, 1998

(87) PCT Pub. No.: WO97/27531

PCT Pub. Date: Jul. 31, 1997

(30) Foreign Application Priority Data

| Jan. 23, 1996 | (JP) | 8-009521 |
| Feb. 28, 1996 | (JP) | 8-067278 |
| May 10, 1996 | (JP) | 8-139689 |

(51) Int. Cl.[7] .................................................. G09G 5/00
(52) U.S. Cl. ........................................ 345/738; 345/744
(58) Field of Search ................................ 345/719, 738, 345/793, 854, 866, 744, 739, 748, 749; 709/203, 218, 217, 224, 232, 310

(56) References Cited

U.S. PATENT DOCUMENTS

| 5,019,963 A | 5/1991 | Alderson et al. |
| 5,105,184 A | 4/1992 | Pirani et al. |
| 5,305,195 A | 4/1994 | Murphy |
| 5,319,455 A | 6/1994 | Hoarty et al. |
| 5,347,632 A | 9/1994 | Filepp |
| 5,446,919 A | 8/1995 | Wilkins |
| 5,504,675 A | 4/1996 | Cragun et al. |
| 5,636,346 A | 6/1997 | Saxe |
| 5,643,088 A | 7/1997 | Vaughn et al. |

(List continued on next page.)

FOREIGN PATENT DOCUMENTS

| EP | 0 749 081 A1 | 12/1996 |
| EP | 0 822 535 A2 | 2/1998 |
| JP | 62-257289 | 11/1987 |
| JP | 5-143653 | 6/1993 |
| JP | 07-261835 | 10/1995 |
| JP | 08-320878 | 12/1996 |
| WO | WO 97/21183 | 6/1997 |
| WO | WO 97/40447 | 10/1997 |
| WO | WO 97/40514 | 10/1997 |
| WO | WO 97/41673 | 11/1997 |
| WO | WO 98/35300 | 8/1998 |
| WO | WO 00/3008 | 5/2000 |

OTHER PUBLICATIONS

Brajnik, "A Shell for Developing Non–Monotonic User Modeling Systems," California Digital Library International Journal of Human–Computer Studies, Jan. 1, 1994, pp. 31–62, vol. 40, No. 1.
Dedrick, Interactive Electronic Advertising, IEEE Multimedia 1994 (Intel Architecture Labs).
Lieberman, "Letizia: An Agent that Assists Web Browsing," M.I.T. Media–La, Cambridge, MA, Aug. 1, 1995.
Halliday, The Trail Guide to Prodigy, 1995, pp. 82,86, 114, 130, 135, 139, 152, 191, 195, 202.
Miller, Using Prodigy, 1995, pp. 26–31, 75, 80, 89, 103, 132, 189, 198, 219, 268, 307.
Akihiro Shirahashi, "Internet and the Foundation of the WWW System" Interface, 21[9], 1995.9.1, CQ–shuppan, pp. 64–74.

*Primary Examiner*—Ba Huynh
(74) *Attorney, Agent, or Firm*—Steven C Sereboff; SoCal IP Law Group

(57) ABSTRACT

An information providing system, which transmits a passive image.such as an advertisement while providing a requested image. The passive image and the requested image, for example, information from the Internet 9, are transmitted from the information provider 4 to the terminal 1 and displayed separately on the display 8. The whole passive image is displayed in the front of the display 8.

16 Claims, 22 Drawing Sheets

U.S. PATENT DOCUMENTS

| | | |
|---|---|---|
| 5,717,923 A | 2/1998 | Dedrick |
| 5,721,827 A | 2/1998 | Logan et al. |
| 5,724,521 A | 3/1998 | Dedrick |
| 5,740,549 A | 4/1998 | Reilly et al. |
| 5,761,662 A | 6/1998 | Dasan |
| 5,768,521 A | 6/1998 | Dedrick |
| 5,774,870 A | 6/1998 | Storey |
| 5,794,210 A | 8/1998 | Goldhaber et al. |
| 5,809,242 A | 9/1998 | Shaw et al. |
| 5,812,784 A | 9/1998 | Watson |
| 5,823,879 A | 10/1998 | Goldberg et al. |
| 5,848,396 A | 12/1998 | Gerace |
| 5,913,040 A * | 6/1999 | Rakavy et al. ............... 709/232 |
| 5,918,014 A | 6/1999 | Robinson |
| 5,933,811 A | 8/1999 | Angles et al. |
| 5,946,646 A | 8/1999 | Schena et al. |
| 5,946,664 A | 8/1999 | Ebisawa |
| 5,959,623 A * | 9/1999 | Van Hoff et al. ............ 345/333 |
| 6,009,409 A | 12/1999 | Adler |
| 6,009,410 A | 12/1999 | LeMole et al. |
| 6,026,368 A | 2/2000 | Brown et al. |
| 6,036,601 A | 3/2000 | Heckel |
| 6,038,367 A * | 3/2000 | Abecassis .................... 386/46 |
| 6,085,229 A | 7/2000 | Newman et al. |
| 6,199,100 B1 * | 3/2001 | Filepp et al. ................ 709/203 |

* cited by examiner

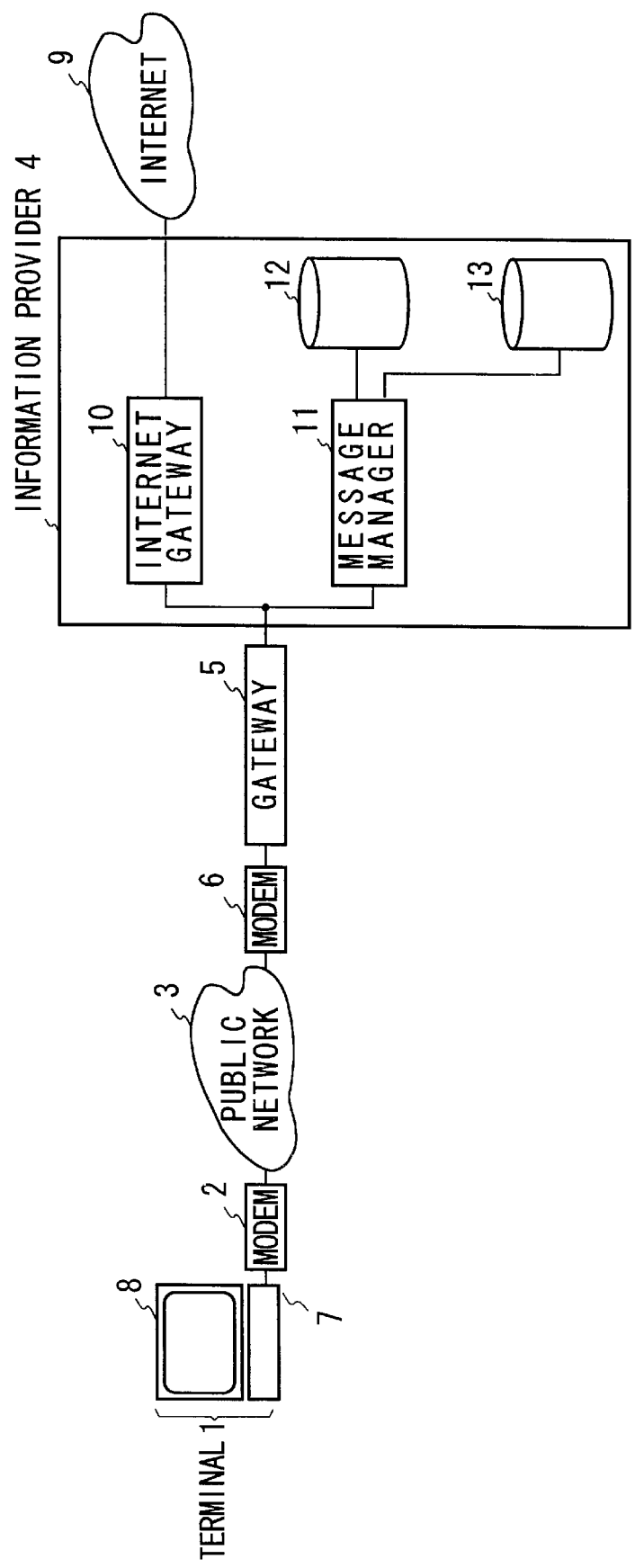
F I G. 1

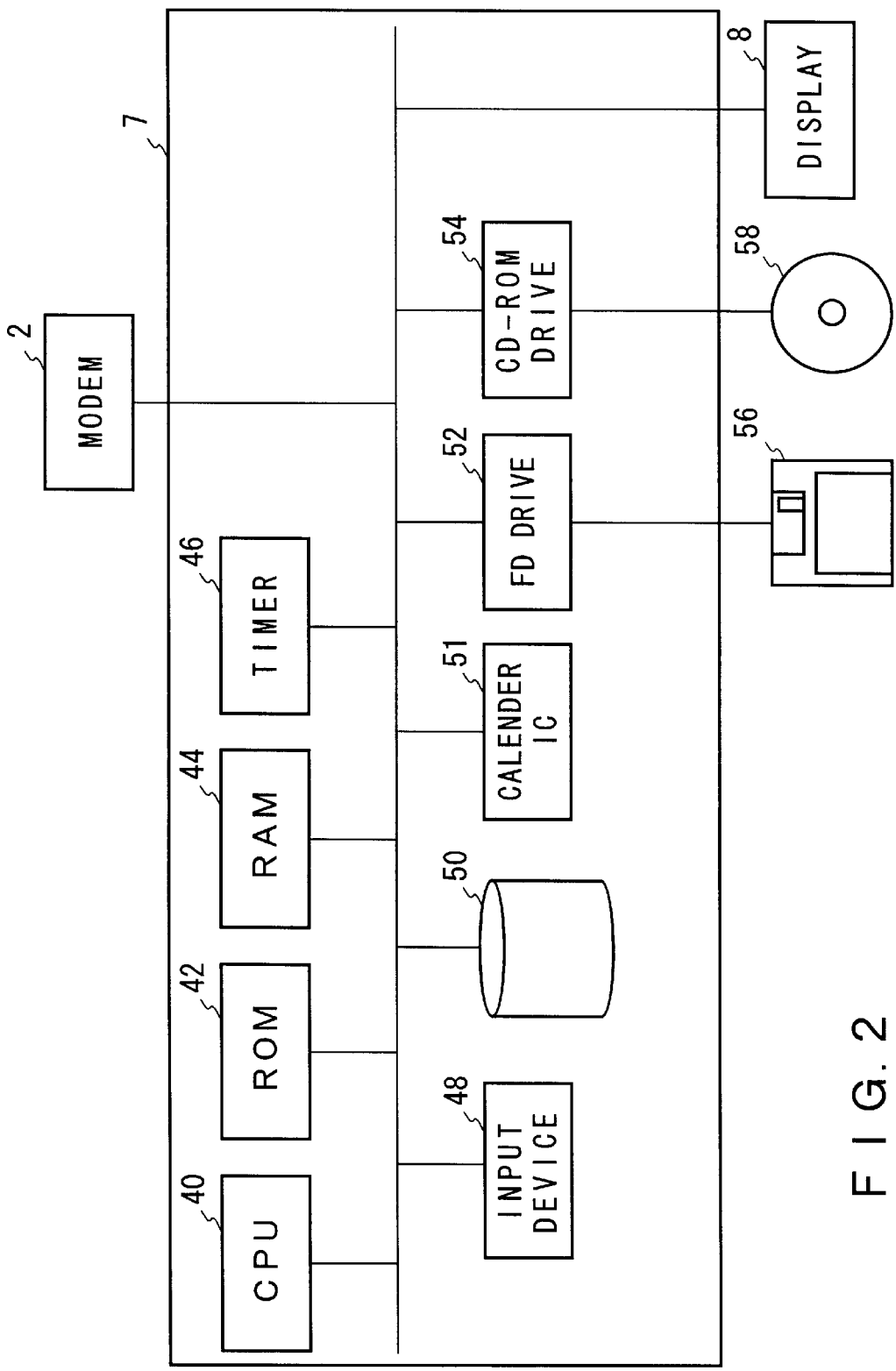
F I G. 2

MESSAGE DATA BASE 12

| MESSAGE ID | INDIVIDUAL LIMIT TYPE | INDIVIDUAL LIMIT | TOTAL LIMIT TYPE | TOTAL LIMIT | DISPLAYED TIME | AGE | SEX | MARRIED | OCCUPATION | ADDRESS | IMAGE DATA |
|---|---|---|---|---|---|---|---|---|---|---|---|
| --- | DAY | 3 | DAY | 1000 | --- | 18-22 | MALE | NO | CORPORATION | TOKYO | □ |
| --- | TOTAL | 10 | MONTH | 10000 | --- | --- | FEMALE | YES | STUDENT | KANAGAWA | □ |
| --- | --- | --- | --- | --- | 1996.1.1 /12:00 | --- | --- | --- | --- | --- | □ |
| --- | --- | --- | --- | --- | --- | --- | --- | --- | --- | --- | --- |

F I G. 3

USER DATA BASE 13

| USER ID | PASSWORD | DATE OF BIRTH | SEX | MARRIED | OCCUPATION | ADDRESS |
|---|---|---|---|---|---|---|
| --- | --- | 1968.6.2 | MALE | NO | CORPORATION | SHINJUKU-KU TOKYO |
| ...... | ...... | ...... | ...... | ...... | ...... | ...... |

F I G. 4

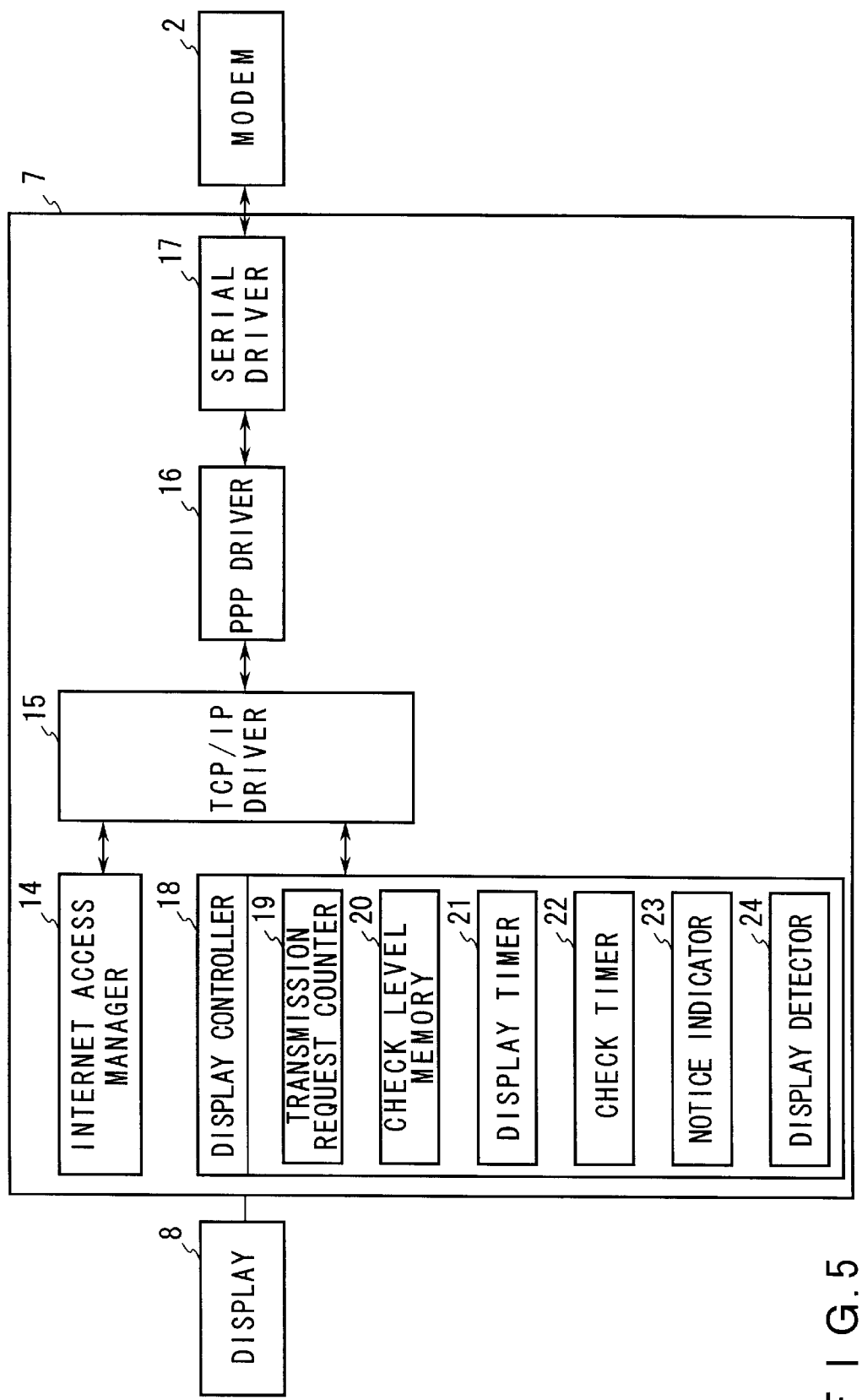
F I G. 5

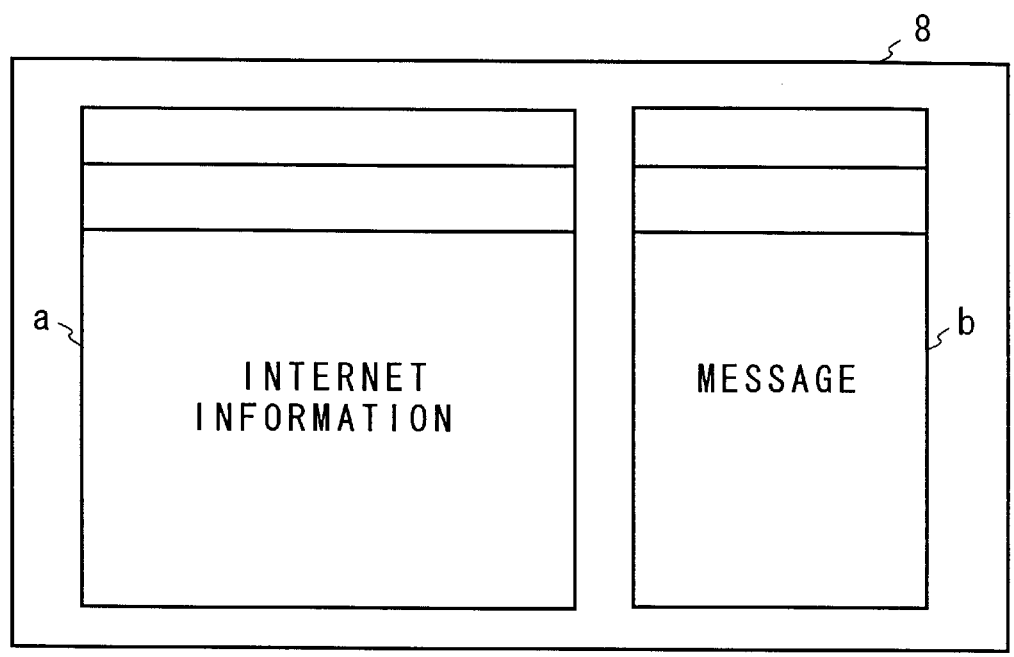
F I G. 6

TOTAL LIMIT MANAGEMENT FILE

| MESSAGE ID | TOTAL LIMIT TYPE | TIME STAMP | DISPLAY COUNTER |
|---|---|---|---|
| --- | DAY | 1996.1.1 | 10 |
| --- | MONTH | 1996.1 | 30 |
| --- | TOTAL | 0 | 50 |
| --- | --- | --- | --- |

F I G. 9

INDIVIDUAL LIMIT MANAGEMENT FILE

| USER ID | INDIVIDUAL LIMIT TYPE | TIME STAMP | DISPLAY COUNTER |
|---|---|---|---|
| --- | DAY | 1996.1 | 3 |
| --- | MONTH | 1996.1.1 | 1 |
| --- | TOTAL | 0 | 10 |
| --- | --- | --- | --- |

F I G. 10

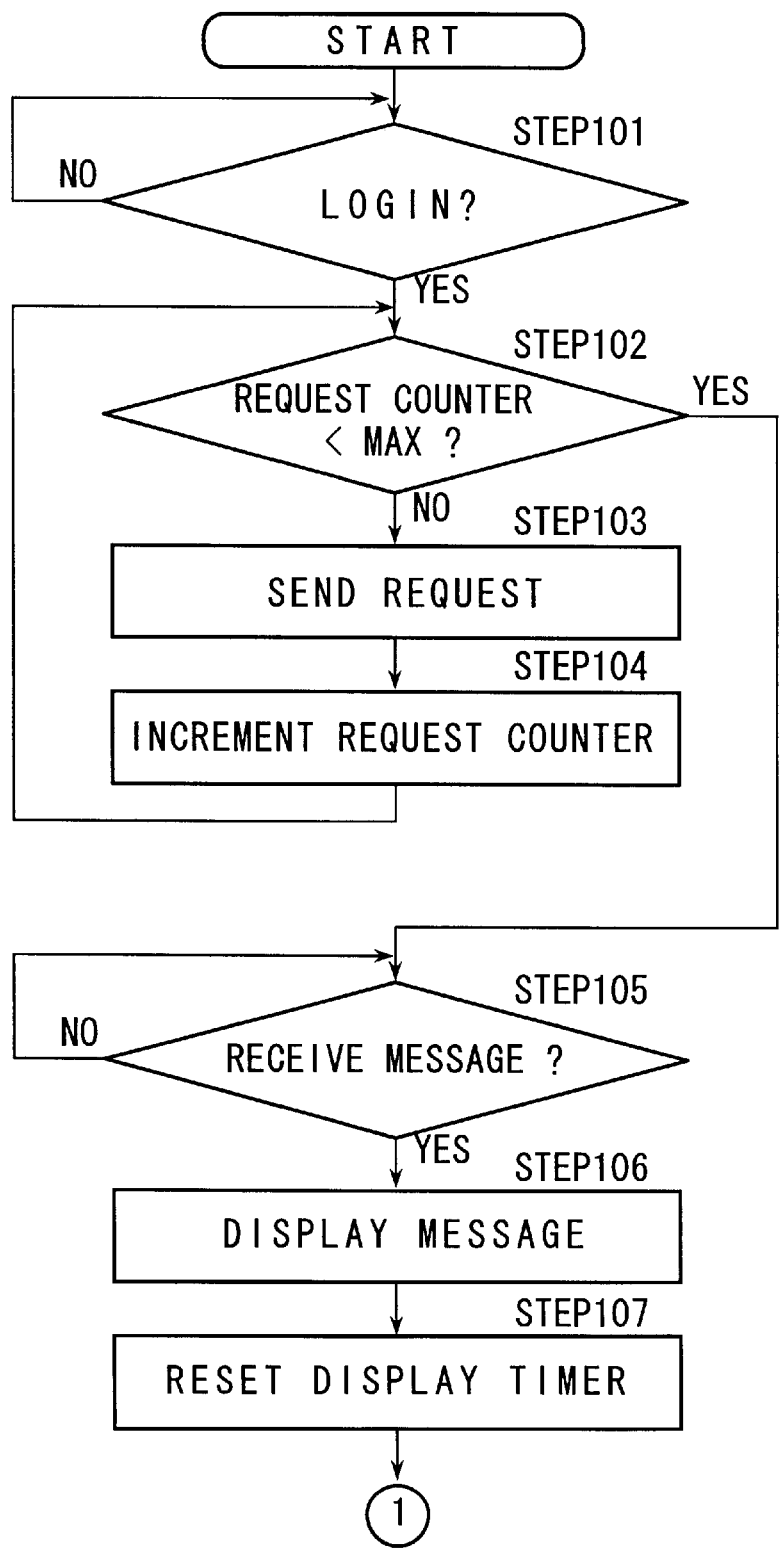
F I G. 11

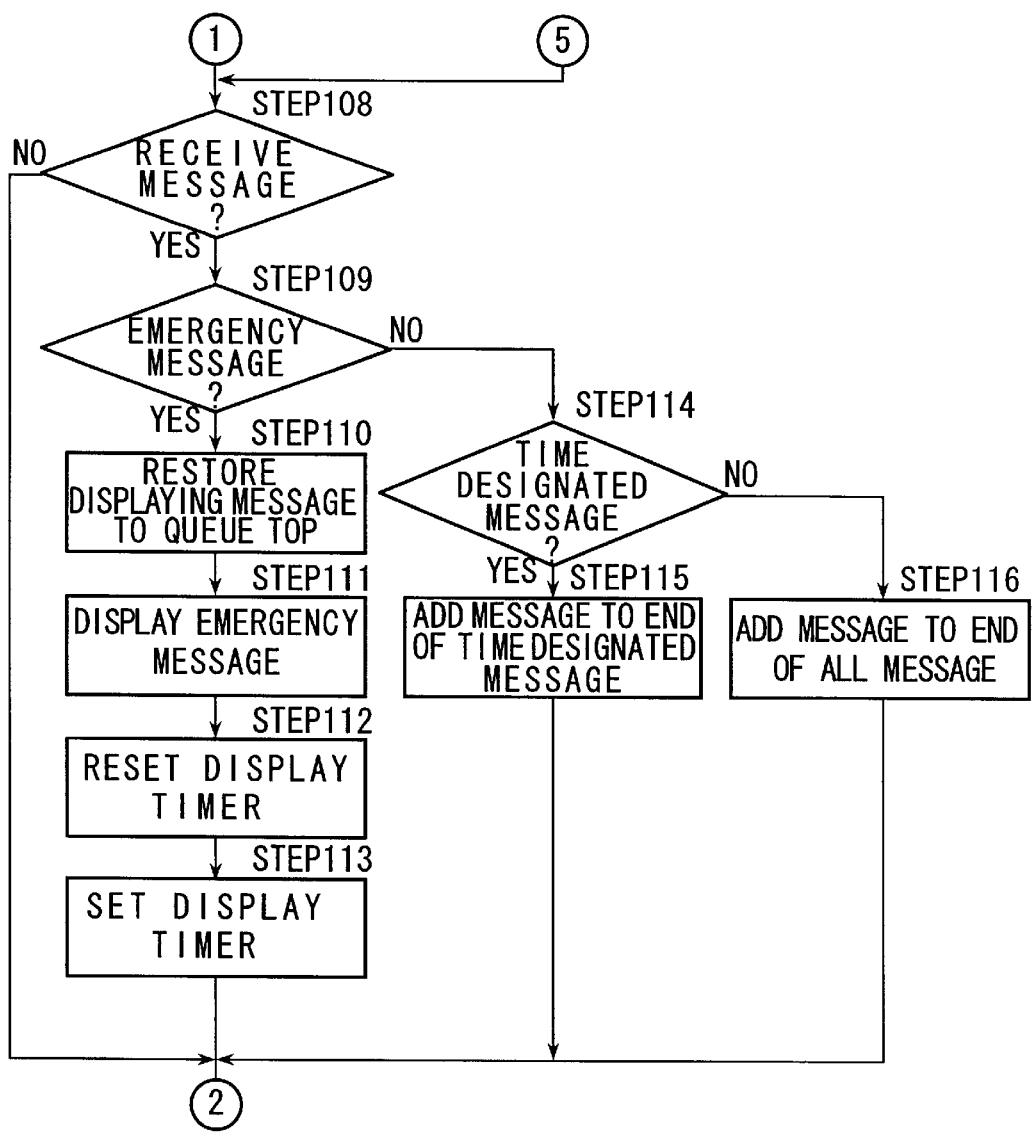
F I G. 12

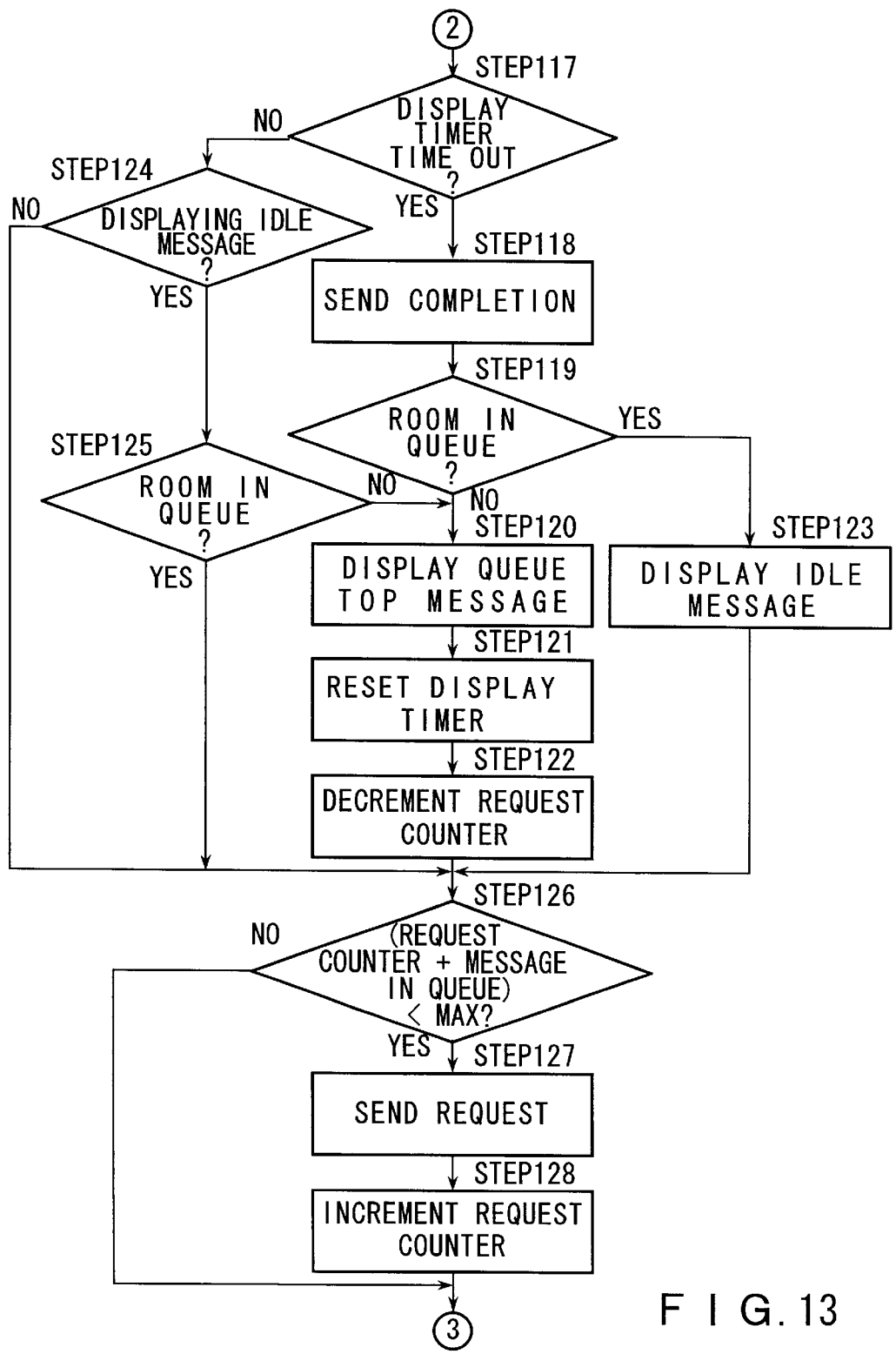
F I G. 13

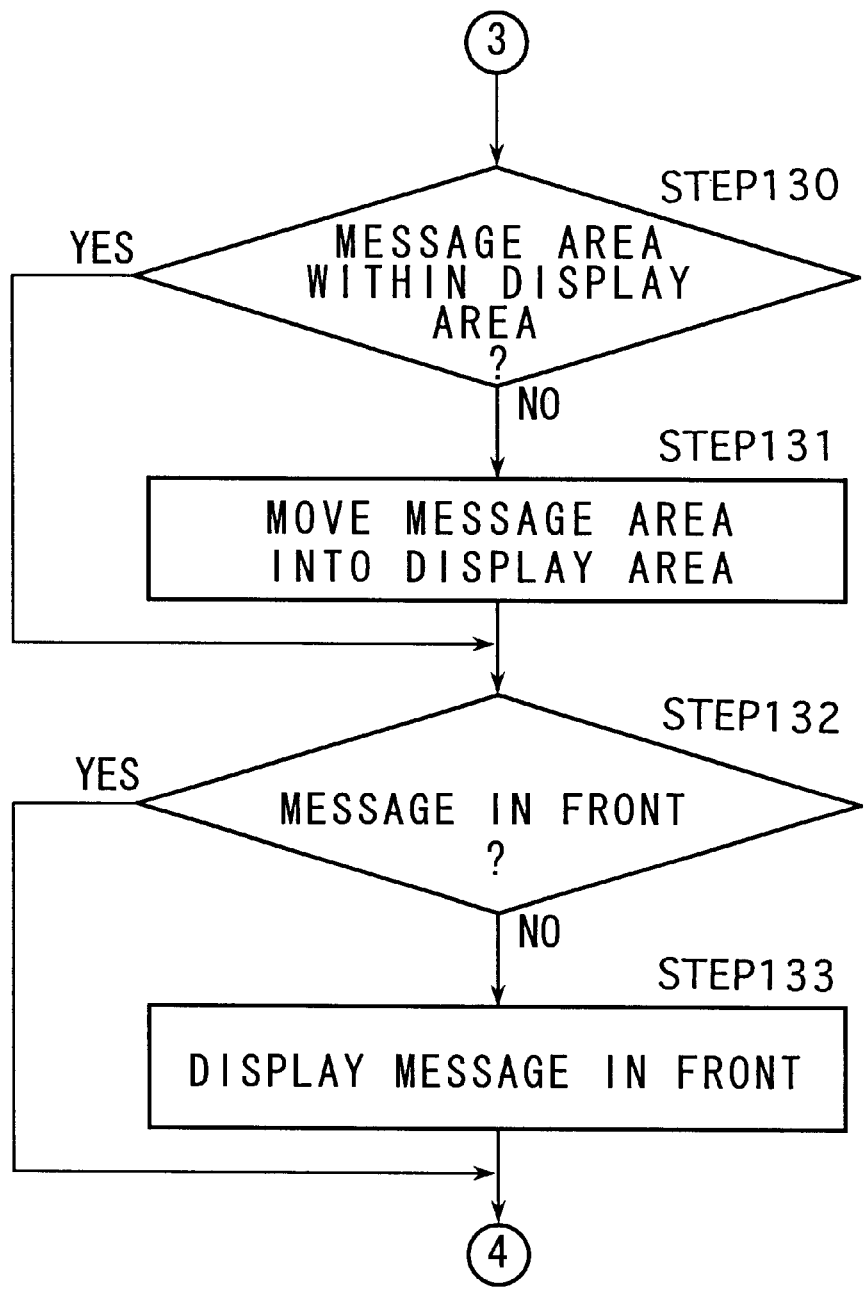
F I G. 14

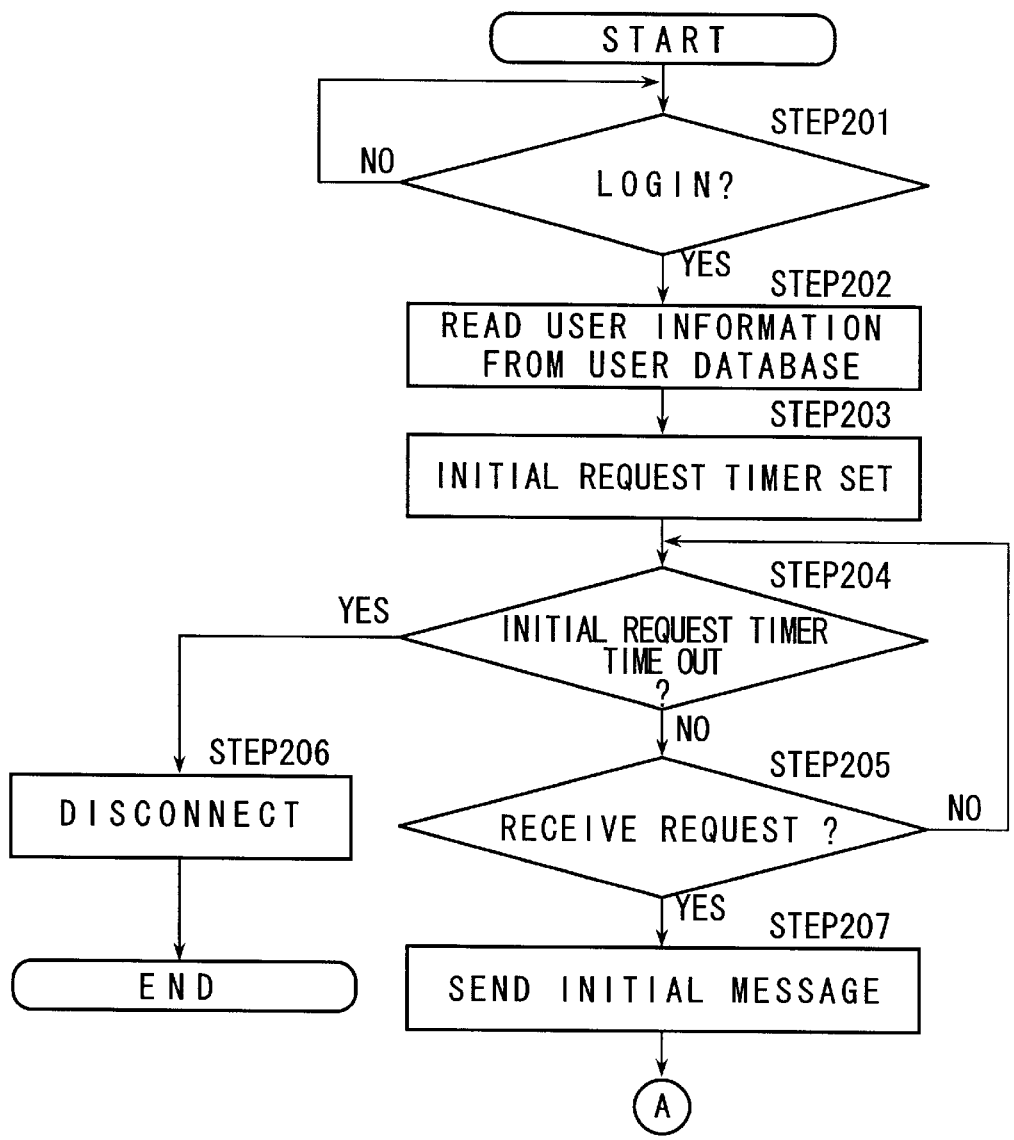
F I G. 17

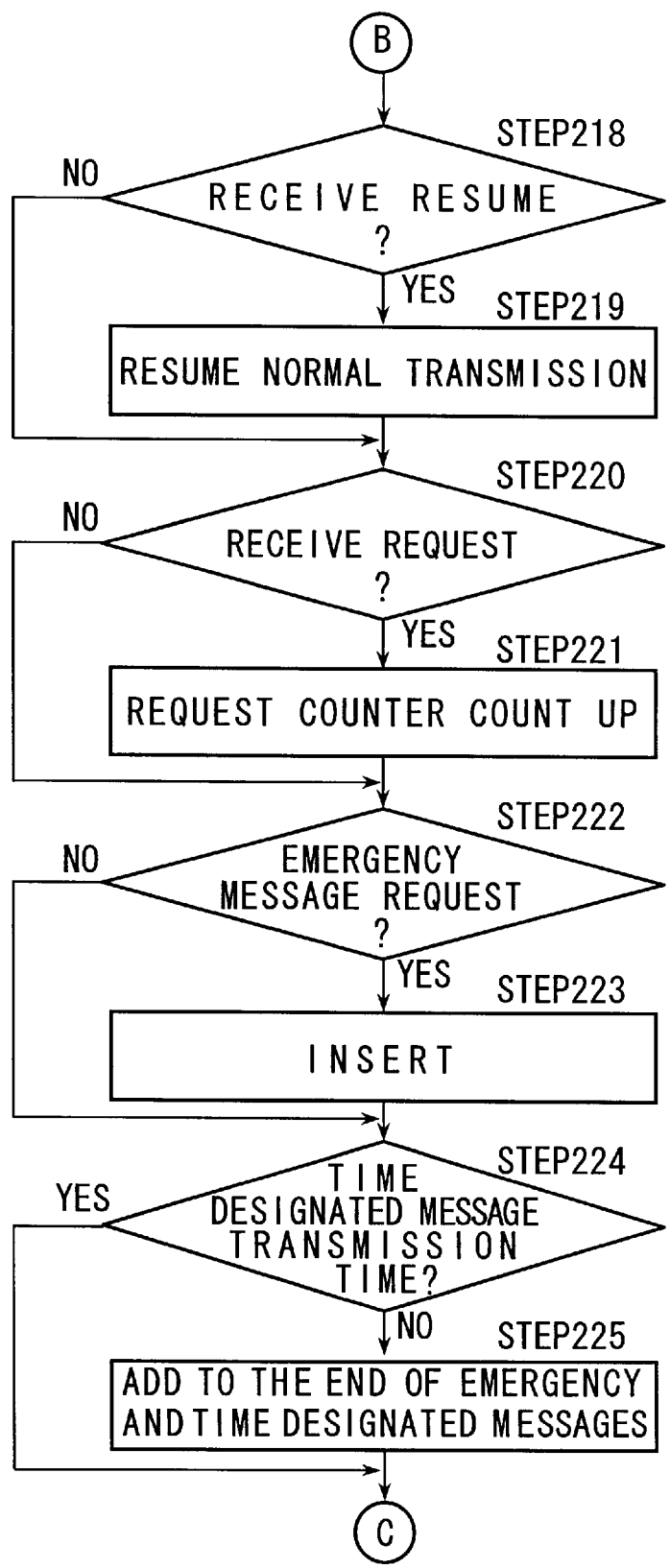
F I G. 19

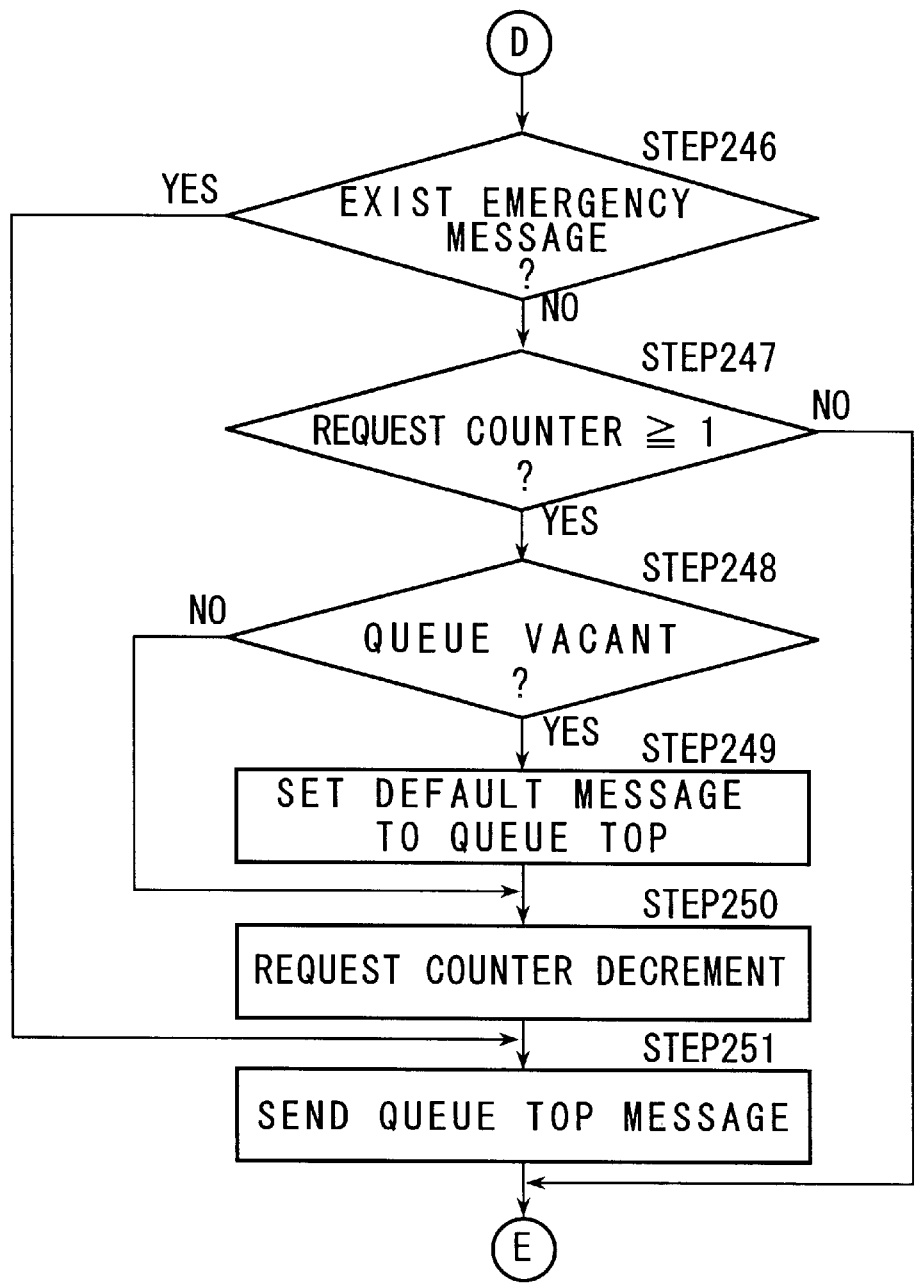
F I G. 21

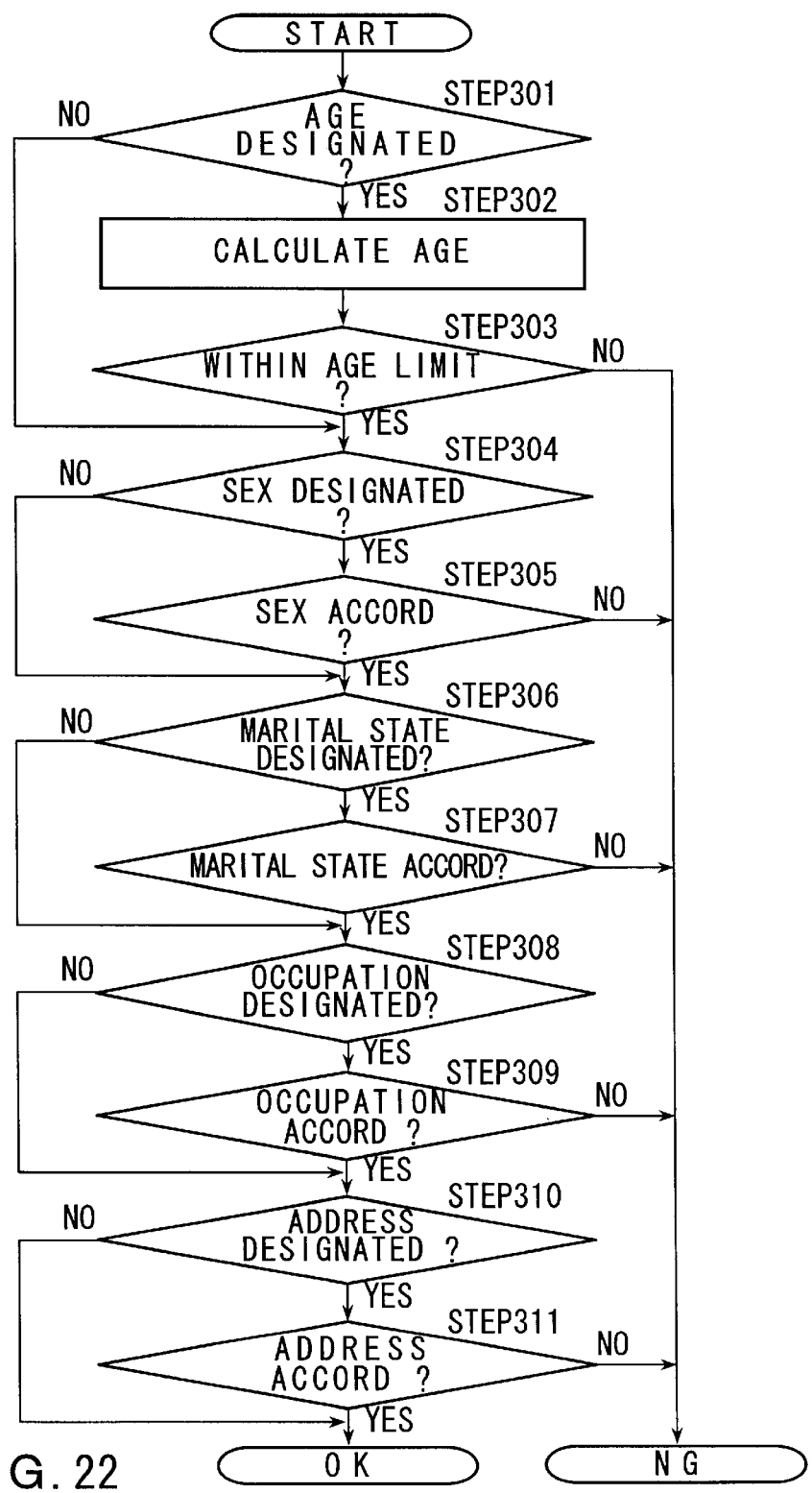
F I G. 22

SYSTEM FOR DISPLAYING TWO INDEPENDENT IMAGES RECEIVED FROM NETWORK

This application is the national phase of international application PCT/JP97/00125 filed Jan. 22, 1997 which designated the U.S.

FIELD OF THE INVENTION

The present invention relates to an information providing system and method using the Internet or the like, a terminal used in the information providing system, and a program-recording medium. The present invention is related to the below six Japanese patent applications. For those designated countries that permit incorporation of publications by reference, the contents of these six Japanese patent publications are incorporated herein by reference, as a part of the description of the present patent application.

1. Application Ser. No. 8-9521 filed on Jan. 23, 1996.
2. Application Ser. No. 8-41104 filed on Feb. 28, 1996.
3. Application Ser. No. 8-67278 filed on Feb. 28, 1996.
4. Application Ser. No. 8-139689 filed on May 10, 1996.
5. Application Ser. No. 8-139690 filed on May 10, 1996.
6. Application Ser. No. 8-163679 filed on Jun. 5, 1996.

RELATED APPLICATION INFORMATION

This application is related to:

Application Ser. No. 09/125,833 filed Feb. 26, 1997, entitled "Communication System Capable of Providing User with Picture Meeting Characteristics of User and Terminal Equipment and Information Providing Device Used for the Same," now U.S. Pat. No. 6,157,946, issued Dec. 5, 2000.

Application Ser. No. 09/633,407 filed Aug. 7, 2000, entitled "Advertising Supported Internet Access Service."

Application Ser. No. 09/125,894 filed Aug. 27, 1998, entitled "Communication System for Distributing Such Message as Advertisement to User of Terminal Equipment."

Application Ser. No. 09/206,385 filed Dec. 7, 1998, entitled "Information Provider, Terminal And System And Recording Medium For The Terminal."

Application Ser. No. 09/188,571 filed Nov. 10, 1998, entitled "Message Searching System and Terminal."

Application Ser. No. 09/276,708 filed Mar. 26, 1999, entitled "Terminal Which Stores Information on Communication Network in Local Memory Automatically."

BACKGROUND OF THE INVENTION

The Internet and other computer networks provide various kinds of information to users. In such kinds of information providing systems, a personal computer (terminal) of the user is normally connected to a host computer of an Internet provider or other network provider through a modem and a public communication network, such as a telephone network and ISDN. When a user accesses the information provider via the terminal, requested information is provided either from the Internet or the computer network or from the information provider. The information provided to the user's terminal is displayed on the terminal display. The user can watch the displayed information (image), scroll the image or switch to a sub-menu by controlling the image.

The image provided from the information provider to the terminal is conventionally displayed in a single display area of the terminal. Newer terminals can display multiple images, such as an image provided from the information provider and terminal file information, to different windows. When the information provider provides images designated by the terminals, passive images such as advertisements are sometimes also provided. Since the images provided to the terminals are conventionally displayed in a single display area (for example, a single window), the passive images are conventionally inserted in the designated images and displayed in the same display area.

When the passive image is inserted in the same display area and the user updates the images in the terminal display by scrolling the screen or clicking a button in the image, the passive image may disappear. Moreover, the passive image may be hidden behind a display of the file information or the other information when the user displays the file information or other information on the terminal. Therefore, with the conventional systems, the display is operated in such a manner that the user does not always see the passive images, such as advertisements. Thus the passive images are not effectively transmitted to the users.

In addition, the passive images are conventionally transmitted to the terminal users randomly. As a result, the passive images could be provided to users who do not want the images or who would not make any response to the passive image. On the World Wide Web (WWW) of the Internet, only the information selected by the user is provided to the user. In other words, information on the WWW is passively transmitted to the user based on the request from the user, and it was not possible for providers, which manage information providing systems, or other host computers to actively provide information to users.

In light of the background described above, it is an object of the present invention to provide an information display system and an information provider which accurately and effectively select and provide passive images, such as advertisements, while also providing the images requested by the user. It is also an object of the present invention to provide an information provider, through which providers on the World Wide Web (WWW) or other host computers can actively provide information while a terminal connected to the information provider selectively receives the passive image.

SUMMARY OF THE INVENTION

To achieve these objects, the present information display system has an information provider, a communication line connected to the information provider, a display, and a display controller which receives an active image (specified image) and a passive image (passive image) from the information provider through the communication line. The information display system displays the active image and the passive image in separate areas of the display.

According to the invention, upon a request from the terminal to the information provider for transmitting active images, the specific active images and passive images are sent to the terminal from the information provider. The active images and the passive images received by the terminal are separately and independently displayed in different display areas of the terminal by the display controller.

Therefore, the active images that the terminal user requests are independently displayed in the corresponding display areas on the display of the terminal. Moreover, because the passive images, such as advertisements, are separately displayed in a display area other than that in which the active images are displayed, the passive images are independently displayed in the display area even if the active images requested by the user are changed in the active image display area.

As a result, the passive images, which have not been intentionally requested by a user (passive images) such as advertisements, are effectively provided while the images intentionally requested by a user (active images) are also provided to the user. The passive image or the window of the passive image is displayed in the front of the display area. In addition, the whole passive image is displayed within the display area. As a result passive images such as advertisements, can be effectively transmitted to the user and the user is effectively made aware of them. In addition, such display control can be accomplished through functions of the OS (operating system), such as Windows95™ of Microsoft Corporation™.

By the operation of the user or of a program installed in the terminal, the passive images may be hidden behind other images or may appear outside the display area, independent of the control of the display controller. The information display system has a detector, which detects whether or not the passive image is in the normal position. The normal position is where the whole passive image is displayed in the front of the display area. When the detector detects the passive image not in the normal position, the notifier provides notice of this.

The information display system may further detect the passive image to be not in a normal position where the passive image is hidden behind other images or has been moved outside the display. In either of these cases, the notifier notifies the user and the user is forced to change the display status (position) of the passive image to normal. The notifier may display the notice on the display.

The present invention also has a display delayer which delays updating the active images when the detector detects that the display status is not normal after a predetermined period of time has elapsed since notification. Further, the updating of the active images is suspended when the detector detects an abnormal status after a predetermined period of time has elapsed since the update was delayed. The communication between the information provider and the terminal may be disconnected when the detector detects the abnormal condition after a predetermined period of time since the update was suspended.

Therefore, when the passive images are not brought back to normal status during a predetermined period of time after the notice is given, the update of the active images requested by the user is delayed by the display delayer, which makes it difficult for the user to browse active images. Further, if the passive image has still not been returned to a normal status during a predetermined time after the delay begins, the active images are suspended and the user can no longer browse new active images. Finally, if the passive images are not brought back to normal status during a further predetermined period of time, the communication between the information provider and the terminal is terminated. In this case, the user cannot obtain the requested images at all. Thus, according to the present invention, when the passive images are not in the normal status, the user receives a series of warnings that he or she has to change the status to normal.

The present invention may comprise a detector which detects whether the passive image is in a normal status where the whole passive image is displayed in the front of the display area, and a display delayer which delays the updates of the active images when it detects that the passive image is not in a normal status. The active images update is delayed by delaying the normal transmission of the active images from the display information provider to the terminal. Such a delay of the transmission is accomplished by transmitting error information to the terminal from the information provider.

The error may be sent at a certain rate within responses to the transmission requests received from the terminal. The active images can be updated. The information display system detects whether the passive image is in a normal status where the whole image is displayed in the front of the display, and suspends updating the active images when the passive image is not in a normal status. The information display system may detect whether the passive image is in a normal status where the whole passive image is displayed in front, and terminate the communication between the information provider and the terminal when the image is not in the normal status.

The display suspender suspends updating the active images by suspending the transmission of the active images from the information provider to the terminal. Such transmission suspension is accomplished by transmitting error information to the terminal from the information provider in response to a request for the transmission from the terminal. The present invention further cancels the delay or the suspension of the active images when the display of the passive images becomes normal within the predetermined period of time of the delay or the suspension.

In addition, in the present invention, if the terminal comprises a display memory which stores the displayed contents of the display, the detector determines whether the passive images are in the normal status by determining whether the contents of the display memory in the display area of the passive images match the passive images transmitted from the information provider. From this, an accurate determination is made whether the passive images are in the normal status.

The information provider may have an image database which stores the passive images and the display condition of each passive image. Each passive image is transmitted to the terminal according to the display condition of the passive image. As a result, each passive image is provided to the user terminal with the requested display condition. The display condition of each passive image stored in the image database may include user information, which indicates users to whom each passive image should be displayed. The information provider transmits the passive image appropriate to the user based on user information stored in a user database and image database.

While the requested images are provided to the user as described above, the passive images corresponding to the user's age, sex, etc. can be effectively provided. The user information may include the age, sex, marital status, occupation, and address of the user.

The display condition of each passive image in the image database includes an individual display limit for each user. The information provider counts the transmissions of each passive image to each terminal and prevents the transmission of the passive image to the terminal when the transmission count reaches the individual display limit for the terminal. Therefore, each passive image is provided to the user a certain number of times less than the display limit, avoiding the situation where the same passive image is provided many times. By setting the display limit to a fixed number of display times within a predetermined period, the same passive image is not provided to the user many times in any predetermined period.

The display condition of each passive image in the image database includes a display transmission time of each passive image. The information provider transmits the passive image at the display transmission time. Thus, each passive image can be provided to the terminal user by transmitting it to the terminal at the requested display transmission time. Therefore, according to the present invention, the passive images (passive image), such as advertisements, can be effectively recognized by and provided to the user while the requested images (active images) are also provided to the users. Meanwhile, the passive images corresponding to the age and sex classifications of the user can be effectively provided.

In another aspect of the invention, an information provider transmits a plurality of types of images to a terminal with a display, using a communication line to which the terminal can be connected. The information provider comprises means for receiving a request from the terminal for an active image actively designated by the user of the terminal, means for selecting the active image designated by the user from among the plurality of types of information based on the user's request, means for selecting a passive image to be displayed on the terminal regardless of the presence of active designation by the user from among the plurality of types of information, and means for transmitting both the active image and the passive image to the terminal to have these images displayed on the terminal.

In still another aspect of the invention, a recording medium is provided, which stores a program for operating a terminal having a display and a means for connecting the terminal to a communication line. The program acting on the terminal comprises means for causing the terminal to connect to an information provider that can transmit a plurality of images, means for causing the terminal to transmit a request for an image actively designated by the user (referred to as an active image) to the information provider, means for causing the terminal to receive the active image selected, based on the request, from among the plurality of images from the information provider, means for causing the terminal to receive an image to be displayed on the terminal regardless of the active designation by the terminal user (referred to as an passive image), and means for having both the active and passive images be received from the information provider and displayed on the terminal.

In still another aspect of the invention, a terminal having a display and a means for connecting the terminal through a communication line to an information provider that can transmit a plurality of images are provided. The terminal comprises means for transmitting a request for an image actively designated by the user of the terminal to the information provider, means for receiving the active image selected, based on the request, from among the plurality of images from the information provider, means for receiving an image to be displayed regardless of the presence of active designation by the user from the information provider, and means for displaying both the active and passive images.

BRIEF DESCRIPTION OF THE DRAWINGS

FIG. 1 shows a total system structure of the information display system according to an embodiment of the present invention.

FIG. 2 is a block diagram of the main body 7 in FIG. 1.

FIG. 3 shows the data structure of the message database of the information provider 4 in FIG. 1.

FIG. 4 shows the data structure of the user database of the information provider 4 in FIG. 1.

FIG. 5 is a functional block diagram of software of the terminal 1 in FIG. 1.

FIG. 6 shows a display 8 of the terminal 1 in FIG. 1.

FIG. 9 is a total limit number management file of the information provider 4.

FIG. 10 is an individual limit number management file of the information provider 4.

FIG. 11 is a flow chart of the terminal 1 in FIG. 1.

FIG. 12 is a flow chart of the terminal 1 in FIG. 1.

FIG. 13 is a flow chart of the terminal 1 in FIG. 1.

FIG. 14 is a flow chart of the terminal 1 in FIG. 1.

FIG. 17 is a flow chart of the information provider 4.

FIG. 19 is a flow chart of the information provider 4.

FIG. 21 is a flow chart of the information provider 4.

FIG. 22 is a flow chart of the information provider 4.

DETAILED DESCRIPTION OF THE PREFERED EMBODIMENT

Figure 7:
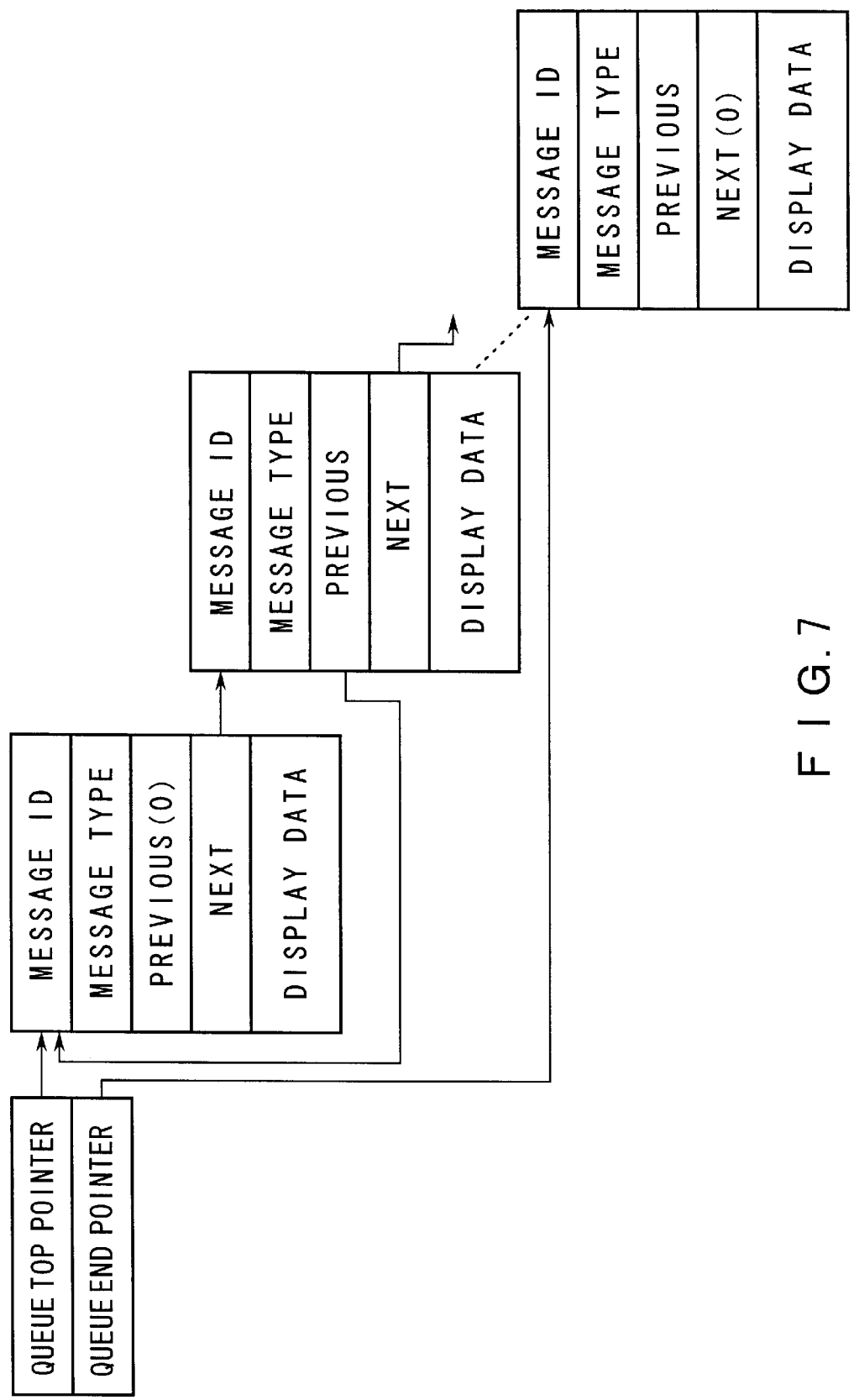
FIG. 7 shows a format of message data stored in the terminal 1 in FIG. 1.

FIG. 1 shows the structure of the information display system in the present embodiment. In this information display system, the terminal 1 of the user is connected to a public network 3 through a modem 2. The information provider 4 has a computer system of the provider is also connected to the public network 3 through a gateway 5 and a modem 6. The terminal 1 and the information provider 4 can communicate through the public network 3. The terminal 1 is has a personal computer, for example, which comprises a main unit 7 connected with the modem 2 and a display 8. FIG. 1 shows only a single body for the terminal 1. However, a plurality of terminals 1 may be connected to the information provider 4 through public network 3.

The information provider 4 has an Internet gateway 10, which is connected to the Internet 9. The terminal 1 can be connected to the Internet 9 through the Internet gateway 10 and obtain information from the Internet 9 by accessing the information provider 4. The Internet gateway 10 and the gateway 5 work as a router. The information provider 4 has a message database 12 which stores image data of the passive images (referred to as messages) such as advertisements, and information such as the transmission condition of the passive images.

The information provider also has a message manager 11 which provides the messages to the terminal 1, an image database and a user database 13. The information from the Internet 9, that is, information designated and supplied to the display according to the user's request, is referred to as active images. On the other hand, the messages, which are automatically supplied to the terminal even if not designated by the user, are referred to as passive images.

FIG. 2 is a block diagram of the terminal 1 of FIG. 1. CPU 40 starts running with the program stored in ROM 42. FD drive 52 and CD-ROM drive 54 read the program or data from floppy diskette 56 and CD-ROM 58, respectively. The CPU 40 installs the program provided by the recording medium, such as the floppy diskette 56 or CD-ROM 58, into the hard disc drive 50, and further reads it out on the RAM 44 for execution. Timer 46 counts a period of time set by the CPU 40, and when the given time has passed, informs the CPU 40 that the time has run out. The calendar IC is backed up by the battery, and supplies the current date and time to the CPU 40. Input device 48 inputs data from the user of the terminal 1.

FIG. 3 shows the structure of the message database 12. The message database 12 stores a message ID, message transmittal condition (type of individual limit, individual limit, type of total limit, total limit, display date, age range, sex, marital status, occupation, and address in FIG. 3) and image data for each message.

The message ID shows an identification of each message. The message transmittal condition data is valid only for when the message is to be selected using the condition. The type of the individual limit indicates the setting of the display limit (the time period for which the display limit applies) when the number of display times for displaying the message to each terminal 1 user (the display limit for transmitting and displaying each message to one terminal 1) is provided. For example, "days" or "months" is shown when the display limit is provided for each day or each month. When the period for which the display limit is not provided, is not designated, "total" is indicated in the table. Then the display limit, with which the message is displayed for each terminal 1 user means the total number limit.

The type of the total limit number indicates the time period of the total limit number (the total number of times each message may be transmitted from the information provider 4 to each terminal 1). For example, when the total limit is provided for each day or each month, "day" or "month" is written. When the period for the total display limit is not designated, "total" is written. The requested total limit for displaying the message to each terminal 1 in each period is written as the total limit.

The display time column shows a designated date (e.g., 1996.1.1, 12:00) when the date to display each message is designated. The age range column shows the age range (e.g., 18–22) when the age range of the user of terminal 1 to whom each message is displayed is restricted. The sex column shows the sex of the user (male or female) when the sex of the user to whom each message is displayed is restricted. When the group of terminal 1 users to whom each message is displayed is restricted on the basis of marital status, data indicating married or single is given in the marital status column.

In the occupation column, the type of occupation (e.g., salary man or student) is given when the group of terminal 1 users to whom each message is displayed is restricted based on occupation type. An address (e.g., Tokyo or Kanagawa-ken) is given in the address column when the group of terminal 1 users to whom each message is displayed is restricted based on address. Image data for each message is given in the image time column.

FIG. 4 shows the structure of the user database 13. The user database 13 stores information relating to the user of the information provider 4. More specifically, the user ID, password, date of birth, sex, marital status (married or single), occupation, and address of each user is stored. Here, in the columns for the user ID and the password, the identification of each user of terminal 1 connected to the information provider 4 and the password required to access the information provider 4 from each terminal 1 are given. In the columns for the date of birth, sex, marital status (married or single), occupation, and address, information corresponding to each item is given.

The information provider 4 is accessed from the terminals 1 and transmits each message to each terminal 1 according to the designated conditions based on the message database 12 and the user database 13 when providing the information from the Internet 9. In addition, the information provider 4 can transmit to the terminal 1 emergency messages, such as earthquake information, besides normal messages, such as advertisements.

FIG. 5 is a block diagram showing the structure of the main unit 7. Software necessary for communicating between the information provider 4 and the Internet 9 is installed in the terminal 1. The main unit 7 has an Internet access manager 14, which controls the reception of data with the Internet 9 through the information provider 4, the TCP/IP driver 15, a PPP driver 16, a serial driver 17 for receiving data through the modem 2, and a display controller 18 for controlling the display 8 of the terminal 1.

FIG. 6 shows an example of the display 8 controlled by the display controller 18. When accessing (requesting) the Internet 9 through the information provider 4, the display controller 18 controls the display 8 to show the messages automatically provided from the information provider 4 (referred to as passive images, or messages) and images actively selected by the user (referred to as active images), obtained from the Internet 9. The active images obtained from the Internet 9 are referred to as Internet images. As shown in FIG. 6, the Internet images and the messages are displayed in separate display areas "a" and "b" in the display 8. The whole message is displayed in the front most window within the display 8.

FIG. 7 shows the structure of the message that the terminal 1 receives from the information provider 4 together with the Internet images. The message has a message identification, a message type which shows the type of the message, such as an earthquake warning requiring emergency display or a particular message designated for a particular display date, and the image data of the message. The terminal 1 receives, into a memory not shown in the figure, a plurality of the messages in a queue format from the address indicated by the top pointer of the queue up to the address indicated by the last pointer of the queue. The display controller 18 displays the images successively, starting from the first in the queue onto the display 8 every predetermined time period.

In FIG. 7, the word "Previous" indicates the memory address of the previous message in the queue. The word "Next" indicates the memory address of the subsequent message in the queue. The transmission of each message from the information provider 4 to the terminal 1 is executed in the same queue format as that described above.

In FIG. 5, the display controller 18executes the display control described above or the like. In the display controller 18, the transmission request counter 19 keeps track of the messages received from the information provider 4. The check level memory 20 stores the check level indicating how long the images are not in the normal status, normal status being where the image data of each message is displayed in the front on the display 8 and the whole message is within the display 8. The display timer 21 measures the predetermined time for displaying each message. The check timer 22 measures the period of the abnormal message status. The notifier 23 displays a notice on the display 8 when the message status is abnormal. The detector 24 detects whether the status of the message on the display 8 is normal.

The display detector 24 detects whether the status of the message display is normal or abnormal by detecting whether the data of a display memory (VRAM) of the display 8 in the display area of the message at the display 8 match the image data of the whole message from the data of the VRAM. In the transmission request counter 19, the count value is increased by 1 each time the terminal 1 requests message transmission from the information provider 4 , and is decreased by 1 each time message display in the queue to the display 8 is completed.

The check level which the check level memory 20 stores is set to "0" (zero) when the status of the message displayed in the display 8 becomes abnormal. The value of the check level is increased by 1 each time the abnormal status persists for a time (predetermined time) of the check timer 22. In addition; the notifier 23 displays a notice on the display 8 when the abnormal status persists for the predetermined time of the check timer 22 after setting the check level memory 20 to 0 (zero).

Figure 8:
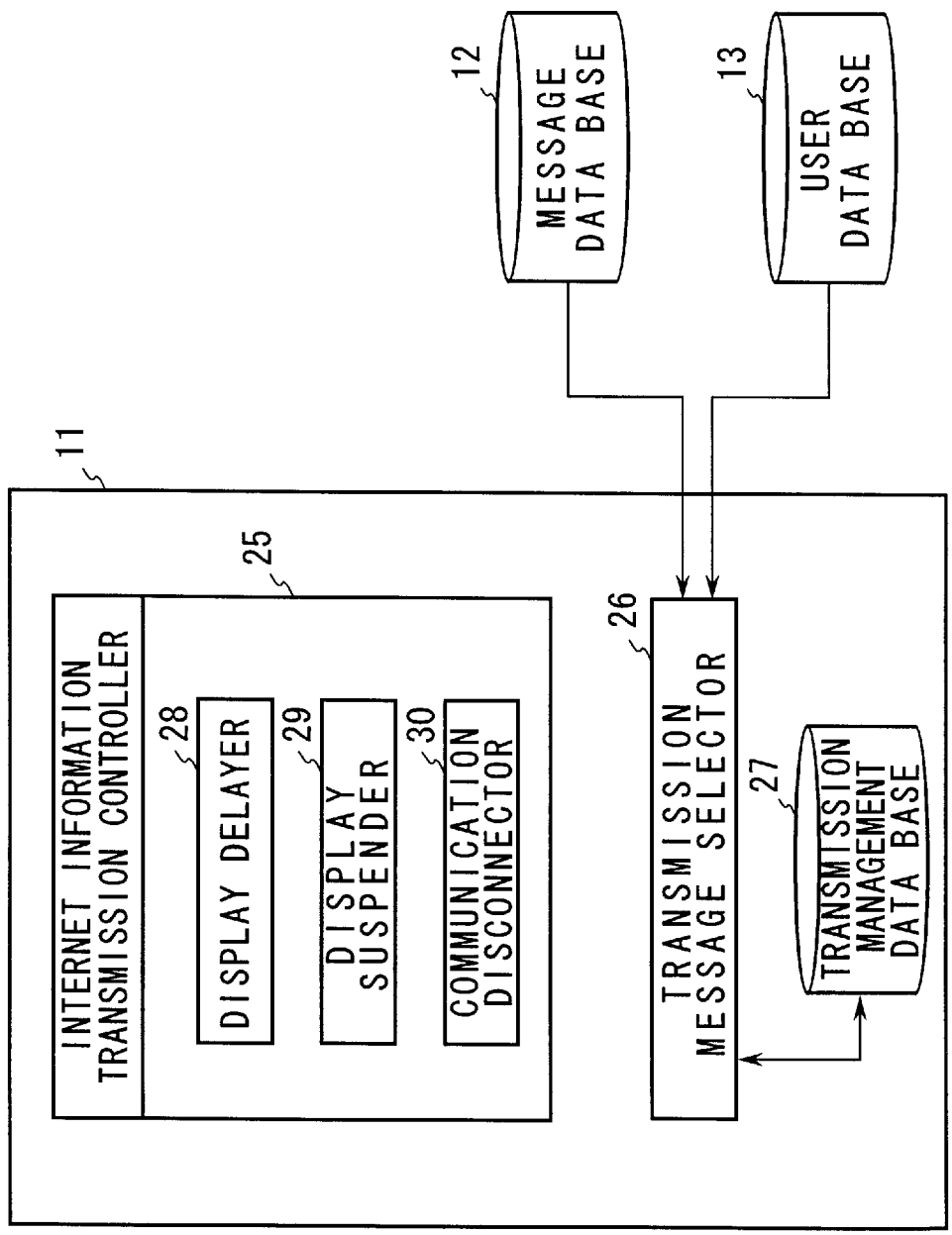
FIG. 8 is a mechanical block diagram of the information provider 4 in FIG. 1.

FIG. 8 shows the message manager 11 of the information provider 4. The message manager 11 has an Internet information transmission controller 25 which manages the transmission of the Internet image from the Internet 9 to the terminal 1, a message selector 26 which selects the message for the terminal 1 based on the information from the message database 12 and the user database 13, and a transmission database 27. The transmission database has files storing the display times (transmission times) when the display limit or the total display limit is designated.

The Internet information transmission controller 25 has a display delayer 28, which delays updating the Internet images provided to the terminal 1. The display suspender 29 suspends updating the Internet images. The communication disconnector 30 disconnects (terminates) the communication between the information provider 4 and the terminal 1. The transmission database 27 has a total limit management file shown in FIG. 9 for counting the display times (transmission. times) of the message, the total limit of which is designated. The transmission database 27 also has an individual limit management file shown in FIG. 10 for counting the display times (transmission times) of each message for each user (each terminal 1).

FIG. 9 shows the total limit management file having columns for message ID, type of the total limit, time stamp, and display counter which holds the total display limit, for each message. In the columns for the message ID and the type of the total limit, the identification and the settings ("days", "months", or "total") for the total limit stored in the message database 12 are stored when the message to which the total limit to display is designated is transmitted for the first time. In addition, in the column for the time stamp, the time stamp at the time of the transmission is stored corresponding to the setting for the total limit to display. For example, if the setting of the total limit to display is per day or per month, the date (e.g., 1996.1.1) or the month (1996.1) at the time of the first transmission is stored as the time stamp. If the setting for the total limit to display is not designated, the time stamp is set as "0" (zero). In the display counter column, the number "1," which indicates the first transmission, is stored at the time of the first transmission of the message to which the total limit to display is designated.

The individual limit management file in FIG. 10 has the user ID, the type of the individual limit, the time stamp, and the display counter which holds the number of transmissions of the message for which a limit to display to each user (each terminal 1) is designated. In the user ID column, the identification of the terminal 1 user to whom the message is transmitted is stored at the time of the first transmission based on the user database 13.In addition, in the columns for the type of the individual limit, the time stamp, and the display counter, the setting of the limit ("day", "month", "total"), the corresponding time stamp (date of the transmission), and the number of transmissions are stored, respectively, in similar fashion as the total limit control file. This individual limit management file is created for each message for which a display limit to each user (each terminal 1) is designated.

FIG. 11 through FIG. 16 show the operation of the terminal 1. When the user of the terminal 1 completes the process of logging on to the information provider 4 to get the requested information from the Internet 9 (YES at S101), the display controller 18 will transmit requests for transmitting messages to the information provider 4 until the count value of the transmission request counter 19 reaches the limit of requests for simultaneous transmissions. The transmission request counter 19 is incremented for each transmission (S102–S104).

When the count value of the transmission request counter 19 reaches the predetermined limit of requests for simultaneous transmissions, the display controller 18 waits until the message is received from the information provider 4 (S105). The received message is displayed in the display 8 of the terminal 1 when the message is received (S106). The received message is stored at the top of the queue as described in FIG. 5. The message at the top of the queue is taken and displayed in the display 8 of the terminal 1. In parallel, the Internet images requested by the terminal 1 user are also transmitted from the information provider 4 to the terminal 1 separately from the messages. Then the Internet images and the messages are displayed in separate display areas a and b in the display 8 as shown in FIG. 4.

In FIG. 12, the display controller 18 determines whether the message has been additionally received (S108) after setting (starting) the.display timer 21 (S107). When not received, the process goes to S117. When the messages (passive images) are received at S108, message type (FIG. 7) is determined. The message type shows whether it is emergency information, such as earthquake information (S1O9). If the received message is an emergency message, the emergency message is displayed on the display 8 (S111) after the message being displayed in the display 8 is returned to the top of the queue (refer to FIG. 7) (S110). The display controller 18 resets the display timer 21 (S112). Then the display controller 18 sets (starts) the display timer 21 again (S113) and goes to S117.

If the received message is not an emergency message at S109, the display manager 18 determines whether the display time is designated by the message (S114). If the display time is designated, the message is added to the end of time designated message and before the other messages (S115). If the display time is not designated by the received message, the message is added behind the last message in the queue (S116) and the process goes on to S117.

Referring to FIG. 13, at S117, the display controller 18 determines whether the predetermined time of the display timer 21 has run out, that is, whether the message has been displayed in the display 8 for the predetermined time. If the message has been displayed in the display 8 for the predetermined time and the display timer 21 is timed out, the process determines whether the queue is empty (S119) after transmitting a signal indicating the message display completion to the information provider 4 (S118). If the queue is not empty and if the message transmitted from the information provider 4 is stored, the message at the top of the queue is read and displayed on the display 8 (S120).

Then the display timer 21 is set (started) (S121), and the transmission request counter 19 is decreased (S122) and the process goes on to S126.

The message in the display 8 is erased when the new message is displayed. If the queue is empty and the message transmitted from the information provider 4 is not stored, the display controller 18 displays a predetermined idle message in the display 8 and the process goes on to S126.

If the display timer 21 has not been timed out in S117, and if the message has not been displayed for the predetermined time, the display controller 18 determines whether the idle message is displayed in the display 8 (S124). If the idle message is not being displayed in the display 8 (and if the message transmitted from the information provider 4 is displayed), the process goes on to S126. If the message being displayed is the idle message, it is then determined whether the queue is empty (S125). If the queue is not empty and the message transmitted from the information provider 4 is kept, the process goes through S120 to 122, and the message at the top of the queue is displayed on the display 8. The display timer 21 is set and the transmission request counter 19 is decreased. If the queue is empty at S125, the process goes on to S126.

In S126, the display controller 18 determines whether the sum of the count of the transmission request counter 19 and the number of the messages in the queue is less than the simultaneous transmission limit. If it is less than the simultaneous transmission limit, a transmission request is sent to the information provider 4 (S127), the transmission request counter 19 is incremented (S128) and the process goes on to S130. If the sum of the transmission request counter 19 and the number of the messages in the queue exceeds the simultaneous transmission limit, the process goes on to S130 without requesting the transmissions to the information provider 4.

With the process described above, the messages transmitted from the information provider 4 are stored in the queue of the terminal 1 successively according to the request for the transmission to the information provider 4. Each message is successively displayed for each predetermined time in the display area b in the display 8 independently from the Internet images for each predetermined time. Moreover, emergency messages are displayed immediately after being received. Time designated messages for which display times are designated are displayed in the display 8 shortly after being received.

Because each message is displayed in the independent display area a in the display 8, displaying the message does not get affected even if the Internet image is updated by scrolling the Internet image displayed in the display 8 with the message by the terminal 1 user or by changing the display menu, and the user is effectively made aware of each message Referring to FIG. 14, in S130, the display controller 18 determines whether the whole message is within the display 8, through, for example, a function of an OS (operating system) provided in the terminal 1. When the user moves a part of the message outside of the display 8, the whole message is forcibly moved back into the display 8 by a function of the OS (S131). For example, Windows 95™ of the Microsoft Corporation™ can be used as an OS having such functions. When the whole message is within the display area, the process goes to S132.

The display controller 18 determines whether the message is the frontmost message on the display 8 (S132), through a function of the OS. If the message is not displayed in front because Internet images are moved in front of the message or other file data or the like is displayed in front of the message, the whole message is forcibly displayed in the front of the display 8 by a function of the OS in the terminal 1 (S133). When it is determined that the message is displayed on the frontmost surface of the display 8, the process goes to the S134.

With the process described above, the message is displayed in the display 8 and at the frontmost surface of the display 8 (normal status), and the user is effectively made aware of each message. However, when a special operation from the terminal 1 is executed by the user, or when a special application software is run by the terminal 1 (e.g., a software which applies a false image of the display 8 to the display controller 18), a situation occurs where despite the fact that the status of the message display is not normal, it is understood as normal status, and the processes S131 and S133 are not executed. To eliminate such cases, the display controller 18 executes the following processes.

Figure 15:
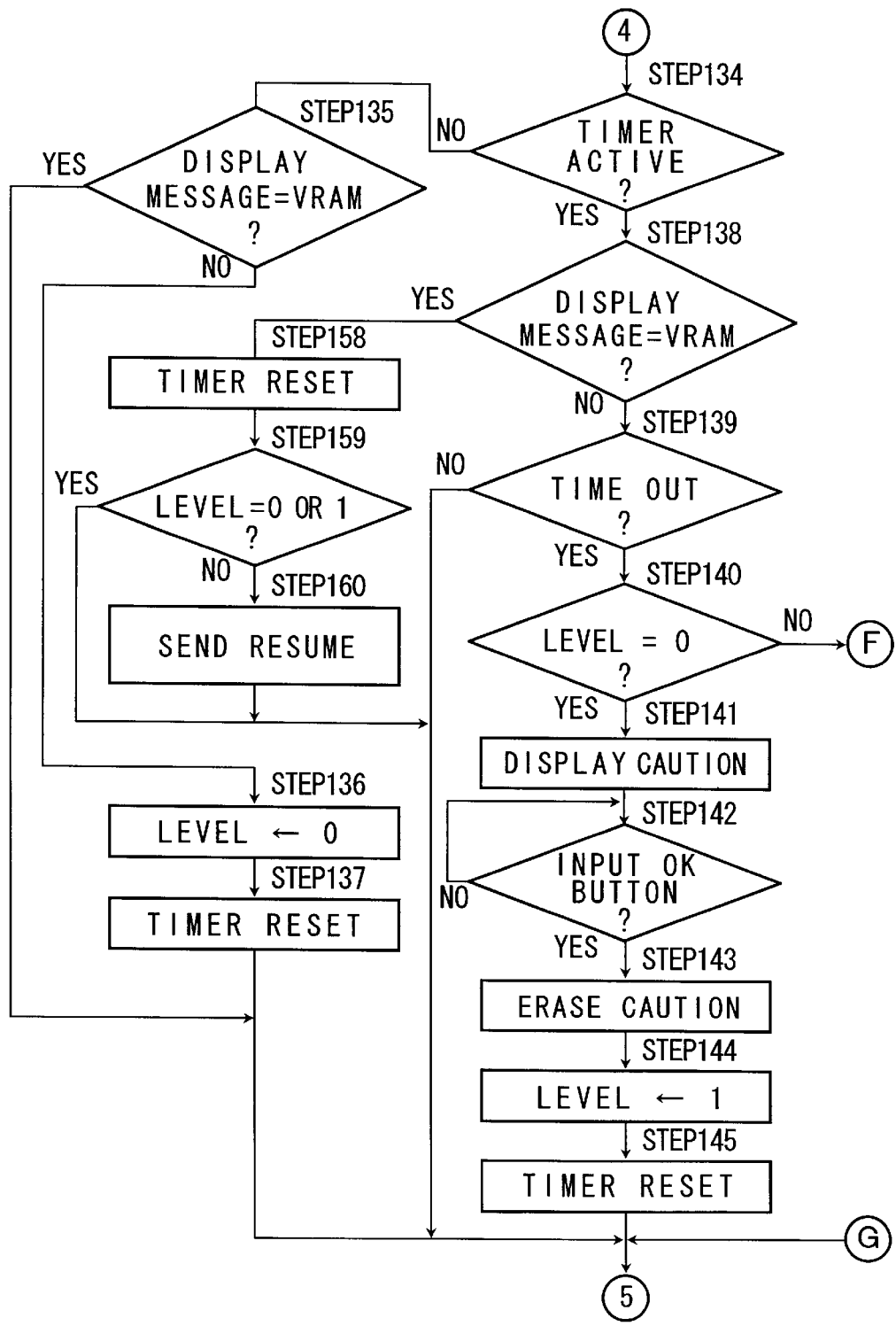
FIG. 15 is a flow chart of the terminal 1 in FIG. 1.

Referring to FIG. 15, after the processes S130 through S133, the display controller 18 determines whether the check timer 22 is being operated (S134). At this time, the check timer 22 is normally not operated. In that case, at S135, a determination is made by the display detector 24 as to whether the received image data of the message being displayed matches the contents of the display memory (VRAM) for the display 8 in the display area of the message. If the actual display of the message is not normal status, then a match obtains, resulting in a repeat of the process by returning to S108.

At S134, if the image data of the message and the contents of the VRAM do not match, and if the actual status of the message display is determined to be abnormal, the check level stored by the check level memory 20 is set to "0" (zero) (S136), and the process returns to S108 after setting (starting) the check timer 22(S137). Here, a state where the check level is 0 shows that the actual status of the message display has changed from normal to abnormal.

When the check timer 22 is being operated at S134 (YES at S134), the display controller 18 determines by the display detector 24 whether normal status obtains, in which the image data of the message and the contents of the VRAM match(S138). If it is determined that abnormal status obtains, a determination is made as to whether the check timer 22 has timed out (S139). If the check timer 22 has not timed out, the process returns to S108. On the other hand, if the abnormal status of the message has continued for more than the predetermined time of the check timer 22 (YES at S139), the display controller 18 determines whether the check level stored in the check level memory 20 is "0" (S140). If the check level is 0, a notice is displayed on the display 8 by the notifier 23 (S141). Therefore, the actual status of the message display is changed from normal to abnormal by the display controller 18. If the abnormal status continues for the time of check timer 22, a notice is displayed on the display 8. The user of the terminal 1 is notified that the display status is normal.

After the display controller 18 displays the notice in the display 8, if the user confirms it and hits the "OK button" (S142), the display controller 18 clears the display of the notice (S143), and the check level in the check level memory 20 is incremented to "1" (S144). Then the check timer 22 is set (started) again (S145), and the process returns to the S108.

Figure 16:
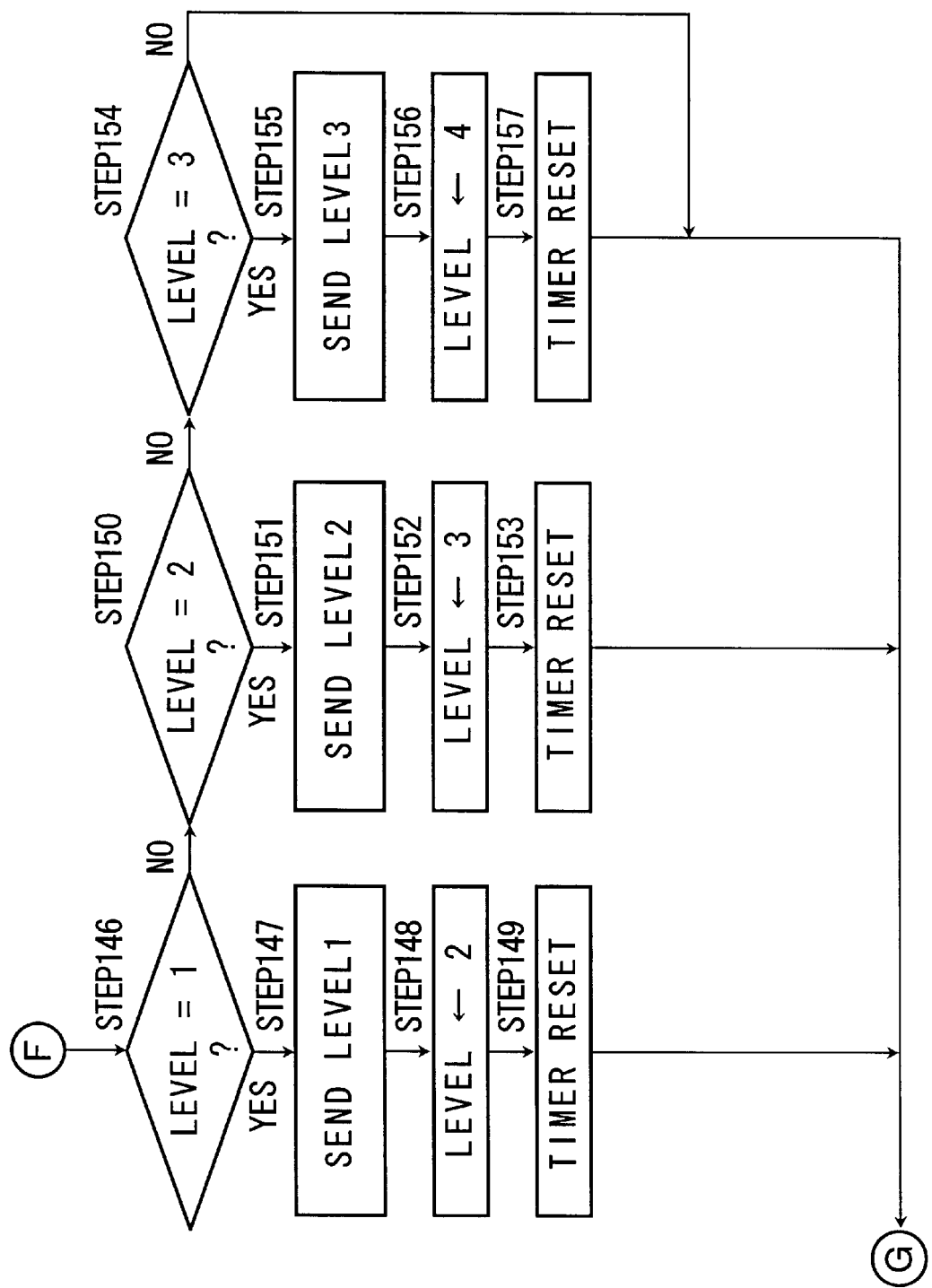
FIG. 16 is a flow chart of the terminal 1 in FIG. 1.
Figure 18:
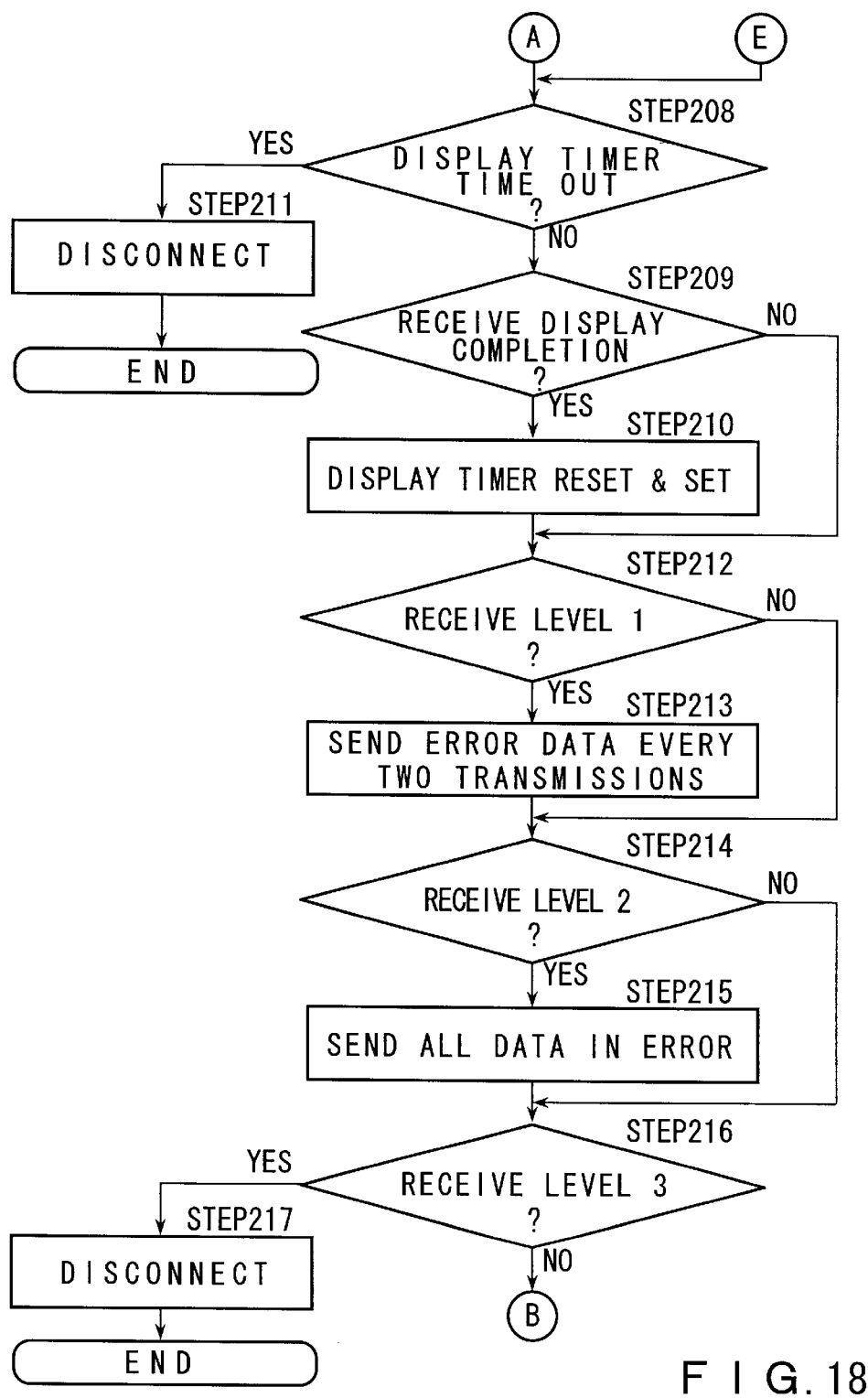
FIG. 18 is a flow chart of the information provider 4.
Figure 20:
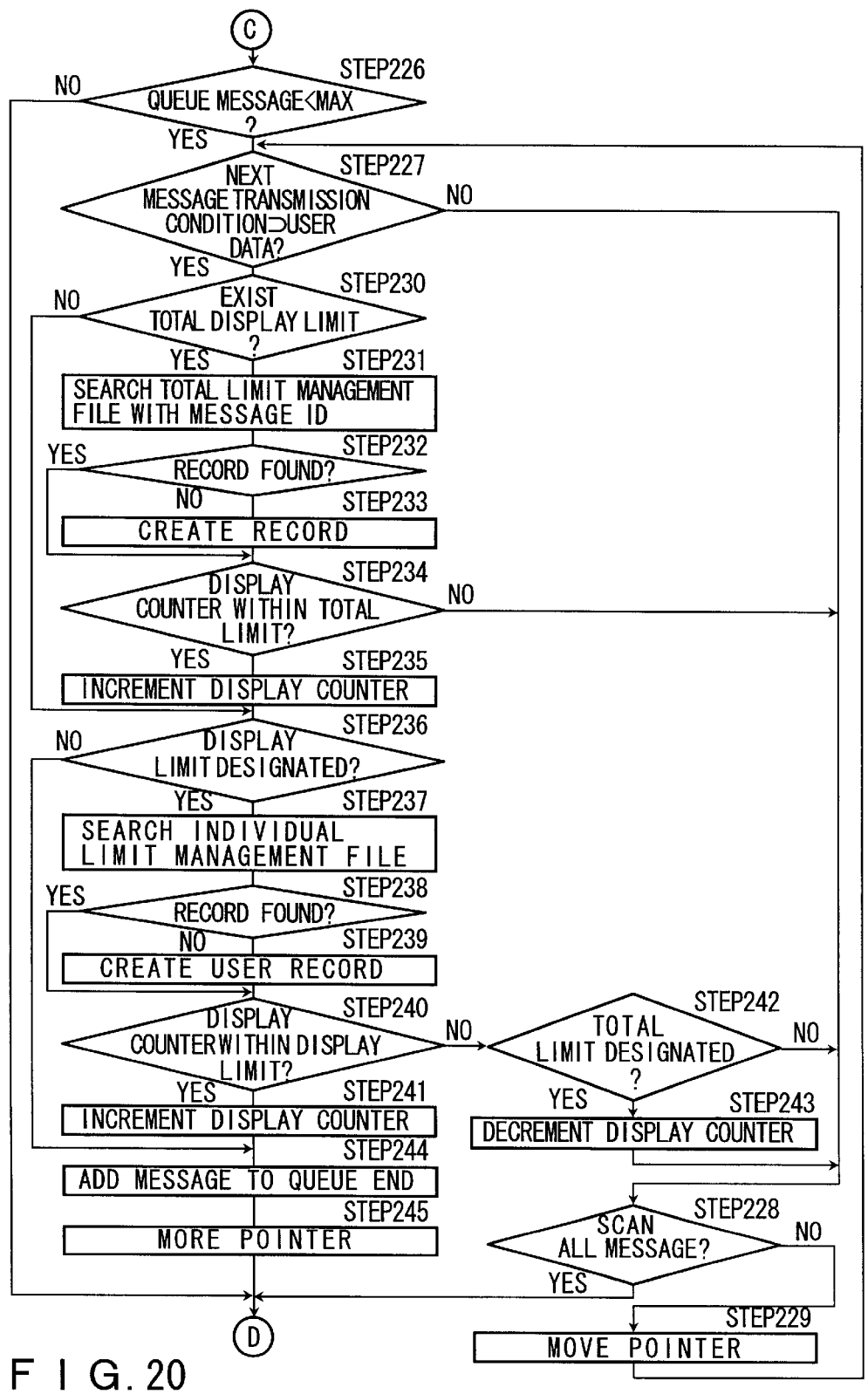
FIG. 20 is a flow chart of the information provider 4.

Referring to FIG. 16, if, despite the display of the notice, the abnormal display of the message continues and if the time of the check timer 22 after the display of the notice is elapsed in this condition, "NO" (check level not 0) is determined at S140. In this case, the display controller 18 determines whether the check level is "1" (S146). If the check level is 1, a level-1 event indication is sent to the information provider 4 (S147). The check level in the check level memory 20 is incremented to 2 (S148). Then the check timer 22 is set again (S149), and the process returns to S108. Thereafter, as long as the abnormal status of the message persists, the check level is incremented by 1 every time the check timer 22 times out until it eventually becomes 4, and a level-2 event and a level-3 event are transmitted to the information provider 4 each time it is incremented (S150–157). When a level-1 event is transmitted after a level-3 event to the information provider 4, Internet images from the information provider 4 to the terminal 1 are delayed or the communication between the terminal 1 and the information provider 4 is disconnected.

On the other hand, if the display status of the message returns to normal during the operation of the check timer 22 (YES at S134), and if the display detector 24 detects it at S135, the display controller 18 resets the check timer 22 (S158) and determines whether the current check level is either 0 or 1 (Sl59). At this time, if the check level is either 0 or 1, the process returns to S108. If the check level is not 0 or 1, that is, if the check level is 2, 3, or 4, the process returns to S108 after transmitting a recovery event indicating that the transmission of the Internet images has returned to normal (S160). In that case, because the check timer 22 stops, it becomes NO at S134, and the check level does not increase as long as the display status of the message is kept normal.

FIGS. 17 to 22 are flowcharts describing the operation of the information provider 4. When each terminal 1 logs in (S201), the message manager 11 in the information provider 4 first obtains the information of the terminal 1 user from the user database 13 (S202) and then starts an initial transmission request waiting timer (S203). If the transmission request is not received from the terminal 1 before the initial transmission request timer times out, due to communication errors, the communication with terminal 1 is disconnected (S204–S206). If the terminal 1 receives the request for the transmission, an initial message set in advance is transmitted to the terminal 1 (S207). This initial message is displayed on the display of the terminal 1 to provide notice that normal communication with the terminal has begun.

In addition, the Internet information, which the terminal 1 user requests to be sent to the terminal 1 is also transmitted in parallel with the other operations. The message manager 11 determines whether the display completion timer has been timed out (S208). In the following steps S209 and S210, the display completion timer is reset or set to measure a predetermined time when the information provider 4 receives an event indicating the completion of displaying a message which is transmitted from the terminal 1 as described above. If the display completion timer is timed out without receiving the display completion event from the terminal 1 within the time of the display completion timer (YES at S208), the same message might be still displayed on the display for more than the predetermined time or communication errors may have occurred (S211). Therefore the information provider 4 disconnects the communication with the terminal 1.

When the display completion event is received from the terminal 1 before the display completion timer times out, the message manager 11 determines whether the level-1 event has been received from the terminal 1 (S212). If the level-1 event has been received, the predetermined time has elapsed after displaying the notice and the status of the message in the display 8 is abnormal in the terminal 1. Then, the message manager 11 transmits to the terminal 1, via the display delayer 28 of the Internet information transmission controller 25, the data (IP packet) of the Internet image in an error which occurs at every other transmission (S213).

Therefore, because the receipt of normal Internet images is delayed, even if the user attempts to update the Internet images being displayed, the terminal 1 cannot obtain the Internet images quickly due to the delay in updating. Therefore, a statement indicating that the display of the message is to be returned from the abnormal status to the normal status is applied to the terminal 1 user more effectively than would be achieved by merely displaying the notice.

If a level-1 event is not received at S212 or after the process at S213, the message manager 11 determines whether a level-2 event transmitted from the terminal 1 is received (S214). If a level-2 event is received, the message manager 11 transmits all the data (IP packet) of the Internet image to the terminal 1 in errors, via the display suspender 29 of the Internet information transmission controller 25, since the display has continued for more than the predetermined time and the display of the message in the display 8 remains abnormal even after delaying the Internet images as described above (S215).

Because the terminal 1 cannot receive the Internet images normally, the user cannot update the Internet images. Therefore, the terminal user is more effectively made aware that he should return the message to normal status If a level-2 event is not received at S214, or after the process at S215, the message manager 11 determines whether a level-3 event transmitted from the terminal 1 has been received (S216). If a level-3 event is received, the predetermined time has passed and the message in the display 8 is abnormal even after updating of the Internet images is terminated in the terminal 1. Therefore the message manager 11 disconnects the communication with the terminal 1 by the communication disconnector 30 of the Internet information transmission controller 25 (S217). As a result the terminal 1 user cannot receive Internet images at all.

If a level-3 event is not received at S216, the message manager 11 determines whether a recovery event has been received from the terminal 1 (S218). Here, the terminal 1 transmits the recovery event when the message status in the display 8 returns to normal within the predetermined time after delaying or terminating the updating of the Internet images. The message manager 11 cancels the delay made by the display delayer 28 or suspension of updating the Internet images made by the display suspender 29 and the data transmission of the Internet images to the terminal 1 returns to normal (S219). As a result, the terminal 1 can normally receive the requested images of the Internet.

In the present embodiment, the status of the message in the display 8 is controlled to be normal. If the message status is abnormal, a notice appears, the Internet information is delayed, the Internet information is suspended, and the communication is disconnected, step by step, depending on how long the abnormal status has persisted. Even if the Internet information is delayed or terminated, the user can receive the requested Internet images normally when the status of the message is returned to normal. The user is accurately and precisely made aware that the message should be changed to normal status. This ensures that the message in the terminal 1 appears in the front of the display and that the whole message appears within the display 8. When the messages are displayed normally in the display 8, the users accurately and effectively take in the messages.

After the above processes, the message manager 11 determines whether it has received new transmission requests from the terminal 1 (S220). If new transmission requests have been received, the transmission request counter is increased (S221). Then, the message manager 11 determines whether there are transmission requests for an emergency message, such as earthquake information (S222). This transmission request is different from the one transmitted from the terminal 1. If there is a transmission request for an emergency message, the emergency message is inserted to the top of the queue in the information provider 4 (S223).

The message manager 11 also determines whether it is the appropriate time to display any of the time-designated messages stored in the message database 12 (S224). If it is the time for transmission, the appropriate time designated message is inserted to the top of the queue before all the messages except the emergency messages and other time designated messages (S225). Next, the message manager 11 determines whether the number of messages in the queue of the information provider 4 is less than the predetermined limit (S226). The process goes to S246 if the number of messages is not less than the limit. On the other hand, if the number of the messages in the queue is less than the limit, and if there is a room in the queue, the message manager 11 proceeds. as follows with the transmission message selector 26.

The messages in the message database 12 are inserted to the queue of the information provider 4 (FIG. 7). The transmission message selector 26 determines whether the message transmission condition of the next message includes the terminal 1 user information in the user database 13 (see FIG. 8) (S227). If it includes this information, the process goes to S230. If the display condition does not include the terminal 1 user condition, the information provider 4 determines whether all the messages in the message database 12 have been scanned (searched) (S228).

If all messages have not been scanned, the search pointer of the message in the message database 12 moves by one and the message condition and the user information are compared again by returning to S227 (S229). If the all messages in the message database 12 have been scanned at S228, the process goes to the S246. As a result, the messages whose transmission condition corresponds to the user information are searched from the message database 12. The time designated messages inserted to the queue at S225 and the messages, whose designated time has not yet been reached, are excluded from the search.

FIG. 22 shows a method for comparing the display condition of the message and the user information at S227. First, whether the message designates an age range is determined (S301). If an age range is designated, the age of the user is calculated based on the date of birth stored in the user database 13 (S302). Then, the calculated age is compared with the age range designated by message (S303). If the calculated age is not within the age range of the message, the message is determined to be no good (NG).

Next, the message selector 26 determines whether the message designates the sex of the user (S304). If the sex is designated, it is determined whether the sex of the user matches the designated sex (S305). If they do not match, the message is determined to be no good (NG). Similarly, if the display condition of the message designates marital status, occupation, or the address of the user, the process determines whether the display condition of the target message corresponds with the characteristics of the user (S306 to S311). If any one of the items which the display condition designates does not correspond, the display condition of the target message is determined to be not good (NG). If the contents of all of the items of the message transmission condition are appropriate for the user, or if none of the items is designated, the message is selected for the user (OK).

After a message whose display condition matches the user has been found (YES at S227 in FIG. 20), the message selector 26 determines from the data in the message database 12 (see FIG. 7) whether the message has a total display limit (S230). If there is no designation of the total display limit, the process goes to S236, which is described later.

If there is a designation of the total display limit, searches are made in the total display limit file shown in FIG. 9 of the transmission database 27, using the message ID of this message as the key (S231). Then, the record corresponding to the message is searched in the total limit management file (S232). If no record found, a record for the message is created in the total limit management file (S233). At this time, the display counter of the message is set to 0 (zero).

If a record is found at S232, or if a new record is created at S233, the message selector 26 determines whether the display counter of the record is below the total limit (S234). If the display counter is below the total limit, the process increments the display counter and goes on to the S236 (S235). If the display counter has reached the total limit, a new message is searched through S228 and S229.

In S236, the message selector 26 determines from the data in message database 12 (see FIG. 7) whether the current message has a display limit per user (per terminal 1). If there is no designation of a display limit, the process goes on to S244.

If an individual limit per user (per terminal 1) is designated, the process searches the individual limit management file (see FIG. 10) corresponding to the current message in the transmission database 27, using the user ID of the user as the key (S237). Then, the process determines whether a record corresponding to the user is found in the limit management file for the current message (S238). If no record found, a record of the user is created in the total limit management file (S239). At this time, the display counter of the user is set to 0.

If a record is found at S238, or if a new record is created at S239, the message selector 26 determines whether the display count of the record of the user is below the limit of the current message (S240). If the display counter is below the limit of the current message, the process goes to S244 after increasing the display counter (S241). If the display counter has reached the limit of the current message, the message selector 26 again determines whether the current message has a total display limit (S242). If no total display limit is designated, a new message is searched through S228 to S229. The display counter of the current message in the total limit management file was increased at S235. If a total display limit is designated, the display counter of the current message is decreased to the original value (S243). A new message is searched through S228 to S229.

If the message selected by the above process is determined to be appropriate for the user and the conditions for the total display limit and the display limit per user are satisfied, then the message is added after the other messages at the end of the queue of the information provider 4 by the message selector 26 (S244). Then, the process moves to S246 after moving the search pointer in the message database 12 to the next message (S245).

In S246, the message manager 11 determines whether there is an emergency message at the top of the queue of the information provider 4. If there is no emergency message, the process determines whether the count value of the transmission request counter indicating the number of the transmission request from the terminal 1 is more than 1 (S247). If the count value of the transmission request counter is more than 1, and if a transmission request has been received from the terminal 1, then it is determined whether there are messages in the queue of the information provider 4 (S248). If there is no message in the queue, a predefined default message is set to the top of the queue (S249). If there is a message in the queue at S248, or if the default message is set at S249, the message at the top of the queue is transmitted to the terminal 1 (S251) after decreasing the transmission request counter (S250). The processes then repeat from S208.

If there is an emergency message at S244, the emergency message is immediately transmitted to the terminal 1 at S251 regardless of any transmission request from the terminal 1. If the transmission request counter is 0 (zero) and no transmission request is received from the terminal 1 at S245, the process returns to S208 without transmitting any message to the terminal 1.

As a modification of the embodiment, the internet image actively selected by the user and the passive message may be displayed in different windows, and when the message window is closed, the communication line between the terminal 1 and the information provider 4 may be automatically disconnected. Alternatively, operation of the system may be arranged so that an event is periodically supplied from the message display controller 18 to the information provider 4, which counts the interval between events. In this case, when no event is supplied from the message display controller 18 for a predetermined period of time, the information provider 4 thereby determines that the message display controller 18 has been forcibly closed by the user, and disconnects the communication line.

The respective "display areas" may be realized by creating different windows, or by dividing one window into a plurality of areas. In the latter case, scrolling in the message area is disabled, while scrolling of the internet information displayed in the different area is allowed, thereby reliably providing the messages to the user.

All or a part of the operations of the information provider 4 and the terminal 1 may be stored as a program in a recording medium. The term "recording medium" in the claims encompasses magnetic discs, such as floppy diskettes, optical discs, such as CD-ROM or DVD, magneto-optic disks, such as MO and MD, and semiconductor media, such as memory cards, miniature cards and IC cards. Furthermore, such a program can be provided through the communications network by using the hard disk drive or semiconductor memory of the information provider or other host computers connected to the communications network as the "recording medium."

The program stored in the recording medium may be read out into the RAM 44 directly and executed by the CPU 40. Alternatively, the program may be installed into the hard disk drive 50 first, and then read out to the RAM 44 for execution. The program may be supplied in a single recording medium, or it may be divided and stored in multiple recording media. The recording media storing the divided program may be sold individually or as a set. The program may be encoded for storage in the recording medium. Any such recording media storing the program in any forms are within the scope of the present invention.

Although the invention has been described in conjunction with the preferred embodiments, the invention is not limited to the embodiments, and those skilled in the art can practice the present invention with various modifications. For example, as an alternative, a portion of the functions of the information provider 4 may be implemented and conducted by the terminal 1. Conversely, a portion of the functions of the terminal 1 may be executed by the information provider 4, as another modification. The functions of the terminal 1 may be limited to merely transferring the user's input to the information provider 4 and displaying the image data received from the information provider 4, so that the rest of the functions of the terminal 1 are implemented by the information provider 4.

A data communications network, such as a LAN, a private line, or the Internet, may be provided between the terminal 1 and the information provider 4. Furthermore, a plurality of host computers may be connected through the data communications network so that each host computer shares all or a portion of the functions of the above described information provider 4, and a portion of the functions of the above described terminal 1. More particularly, providers, to which the user directly connects the terminal using a public line, such as a PSTN or ISDN, and other host computers connected through the Internet or other networks may share and execute all or a portion of the functions of the above described information provider 4 and a portion of the functions of the terminal 1. In this case, the term "information provider" in the claims corresponds to any or all host computers connected to the network.

These modifications in the design are obvious to those persons having an ordinary skill in the art, and are clearly within the scope of the invention defined by the appended claims. The applicant intends to file a continuation application based on the present international patent application in the United States, which is one of the designated countries, instead of proceeding to the national phase procedure.

ADVANTAGE OF THE INVENTION

According to the present invention, passive information selected by the communications network which includes the information provider 4 is forcibly displayed on the display of the terminal 1, regardless of the content or type of information which is actively selected by the user of the terminal 1. For example, advertisements of goods or services can be supplied to the user as passive information. Such advertisements are reliably provided to users, while the users are using the communications network.

Via the processes of the information provider 4, each message in the message database 12 is provided to the appropriate users. Each message is displayed onto the display 8 of the terminal 1 according to the display condition including the total display limit, the individual display limit per user, and the display time. Therefore, messages are not provided to any given user more times than is necessary. Also, messages are not provided which would be irrelevant to the user. Each message is provided and appropriate number of times, at the appropriate times, to the appropriate users.

In the present embodiment, the time-designated messages were provided from the information provider 4 to the terminal 1 without determining the user information. However, the time-designated messages can be provided to the users whose characteristics correspond to the message transmission conditions. The present embodiment provided information from the Internet 9. However, the present invention can be applied to a system, which provides information from general computer networks.

What is claimed is:

1. A terminal for displaying user-selected images and for forced display of images from a network, the terminal comprising
   a communication interface for establishing a communication line to a gateway controlled by an information provider
   a display
   a display controller for requesting and receiving a first image and a second image through the communication interface from the network, for placing the second image in a queue, and for displaying the first image and the second image in separate and distinct display areas, the display controller including
      means for establishing a first TCP/IP link with a first link identification on the communication line
      means for receiving the first image from the information provider using the first TCP/IP link
      means for establishing a second TCP/IP link on the conmmunication line with a second link identification, the second link identification being different from the first link identification
      means for receiving the second image through the second TCP/IP link
      a transmission request counter, the transmission request controller for incrementing a count value when the terminal requests the second image and for decrementing the count value when the second image has been displayed
      a display timer for measuring a predetermined time for displaying the second image
   wherein the first image is designated and supplied to the display according to a request of a user of the terminal
   wherein the second image is automatically supplied to the terminal.

2. The terminal of claim 1 wherein the display controller displays the second image in the front of the display.

3. The terminal of claim 2 wherein the display controller displays the whole second image within the display.

4. A recording medium storing a program for operating a terminal having a display and a communication interface for connecting to a gateway controlled by an information provider, the program comprising
   means for causing the terminal to establish a communication line and connect to the information provider through the communication interface
   means for accepting a designation of a user of the terminal of a first image to display on the terminal
   means for causing the terminal to transmit a request for the first image through the communication line
   means for establishing a first TCP/IP link with a first link identification on the communication line
   means for causing the terminal to receive the first image using the first TCP/IP link
   means for establishing a second TCP/IP link on the communication line with a second link identification, the second link identification being different from the first link identification
   means for causing the terminal to receive a second image through the second TCP/IP link, wherein the second image is automatically supplied to the terminal
   means for causing the terminal to receive the second image aqueue
   means for placing the second image in the queue
   means for displaying the first image in a first display area of the display
   means for displaying the second image in a second display area of the display
   a transmission request counter for incrementing a count value when the terminal requests the second image and for decrementing the count value when the second image has been displayed
   a display timer for measuring a predetermined time for displaying the second image
   wherein the second display area is separate and distinct from the first display area.

5. The recording medium of claim 4 wherein the program further comprises display control means for having the first image and the second image be displayed in different windows.

6. The recording medium of claim 4 wherein the program comprises
   detecting means for detecting whether or not the display state is normal, a normal display state being a display state in which the entire second image is displayed on the front-most surface of the display area and within an allowed area of the display
   means for having the communication between the terminal and the network be disconnected when the detecting means detects that the display state is not normal.

7. A terminal having a display and a communication interface for connecting the terminal through a communication line to a gateway of an information provider, the terminal comprising
   means for accepting a designation of a user of the terminal of a first image to display on the terminal
   means for transmitting a request for the first image through the communication line
   means for establishing a first TCP/IP link with a first link identification on the communication line
   means for receiving the first image using the first TCP/IP link
   means for establishing a second TCP/IP link on the communication line with a second link identification, the second link identification being different from the first link identification
   means for receiving a second image through the second TCP/IP link, wherein the second image is automatically supplied to the terminal
   a queue
   means for placing the second image in the queue
   means for displaying the first image in a first display area of the display
   means for displaying the second image in a second display area of the display
   a transmission request counter for incrementing a count value when the terminal requests the second image and for decrementing the count value when the second image has been displayed
   a display timer for measuring a predetermined time for displaying the second image
   wherein the second display area is separate and distinct from the first display area.

8. A method of operating a terminal, the terminal comprising a display which allows multiple windows as part of a graphical user interface, each window comprising a separate and distinct display area having independent control, the terminal communicating with a computer network, the method comprising
   establishing a communication line from the terminal to the computer network establishing a first TCP/IP link with a first link identification on the communication line activating a browser program opening a browser window on the display making requests of servers on the computer network on behalf of a user of the browser program for first images, wherein the first images are designated and supplied according to a request of a user of the terminal receiving the first images from the servers using the first TCP/IP link displaying the first images in the browser window establishing a second TCP/IP link on the communication line with a second link identification the second link identification being different from the first link identification opening a second window on the display, wherein the second window cannot be hidden by the browser window requesting that a server on the computer network send a second image automatically supplied to the terminal incrementing a count value when the terminal requests the second image receiving the second image through the second TCP/TP link placing the second image in a queue displaying the second image in the second window decrementing the count value when the second image has been displayed measuring a predetermined time for displaying the second image.

9. The method of operating a terminal of claim 8 wherein the second image is selected by an information provider.

10. The method of operating a terminal of claim 8 wherein the terminal communicates with the computer network via a communication line, the method further comprising closing the communication line if the second window is closed.

11. A method of operating a terminal, the terminal comprising a display which allows multiple windows as part of a graphical user interface, each window comprising a separate and distinct display area having independent control, the terminal communicating with a computer network, the method comprising establishing a communication line from the terminal to the computer network establishing a first TCP/IP link with a first link identification on the communication line activating a browser program the browser program opening a first window on the display for displaying first images, wherein the first images are designated and supplied according to a request of a user of the terminal making requests of servers on the computer network for the first images receiving the first images from the servers using the first TCRP/IP link displaying the first images in the first window establishing a second TCP/IP link on the communication line with a second link identification the second link identification being different from the first link identification automatically opening a second window on the display for displaying second images automatically supplied to the terminal, wherein the second window is displayed in front of the first window requesting that a given server on the computer network send a one of the second images incrementing a count value when the terminal requests the one of the second images receiving the requested second image through the second TCP/IP link placing the requested second image in a queue displaying the requested second image in the second window decrementing the count value when the requested second image has been displayed measuring a predetermined time for displaying the requested second image receiving a user input to close the second window closing the second window.

12. The method of operating a terminal of claim 11 wherein the second image is selected by an information provider.

13. The method of operating a terminal of claim 11 further comprising keeping the second window in the front of the display.

14. The method of operating a terminal of claim 11 wherein the terminal communicates with the computer network via a communication line, the method further comprising closing the communication line if the second window is closed.

15. The terminal of claim 1 wherein the display areas are two windows.

16. The terminal of claim 1 wherein the display areas are two areas of a single window, wherein the display area in which the first image is displayed is scrollable and the display area in which the second image is displayed is not scrollable.

* * * * *

UNITED STATES PATENT AND TRADEMARK OFFICE
CERTIFICATE OF CORRECTION

PATENT NO.    : 6,639,608 B1
DATED         : October 28, 2003
INVENTOR(S)   : Itakura It is certified that error appears in the above-identified patent and that said Letters Patent is hereby corrected as shown below:

Column 19,
Line 20, "conmmunication" should be -- communication --.
Line 64, "aqueue" should be -- a queue --.

Column 21,
Line 25, "TCP/TP" should be -- TCP/IP --.

Column 22,
Line 6, "TCRP/IP" should be -- TCP/IP --.
Line 10, "identification the" should be -- identification, the --

Signed and Sealed this

Sixth Day of January, 2004

JAMES E. ROGAN
*Director of the United States Patent and Trademark Office*